(12) United States Patent
Burghart et al.

(10) Patent No.: US 6,727,314 B2
(45) Date of Patent: Apr. 27, 2004

(54) CROSSLINKING SYSTEMS FOR ACRYLIC LATEX FILMS

(75) Inventors: Armin Burghart, Warren, MI (US); Robert Shane Porzio, Charlotte, NC (US); Dieter Urban, Ludwigshafen (DE)

(73) Assignee: BASF AG, Rheinland-Pfalz (DE)

( * ) Notice: Subject to any disclaimer, the term of this patent is extended or adjusted under 35 U.S.C. 154(b) by 142 days.

(21) Appl. No.: 10/023,400

(22) Filed: Dec. 13, 2001

(65) Prior Publication Data

US 2003/0195297 A1 Oct. 16, 2003

(51) Int. Cl.$^7$ ............................................... C08F 220/10
(52) U.S. Cl. ....................... 524/523; 524/556; 524/501; 524/542; 524/578; 524/238.3; 522/6; 554/25; 554/26; 554/219; 526/322; 526/316
(58) Field of Search ................................. 524/556, 501, 524/542, 523, 578, 238.3; 522/6; 554/25, 26, 219; 526/322, 316

(56) References Cited

U.S. PATENT DOCUMENTS

| | | | |
|---|---|---|---|
| 3,894,978 A | 7/1975 | Montesissa et al. | 260/22 CB |
| 3,979,346 A | 9/1976 | Zückert et al. | 260/23 CP |
| 4,108,811 A | 8/1978 | Eckhoff | 260/22 TN |
| 4,299,742 A | 11/1981 | Belder et al. | 260/22 EP |
| 4,301,048 A | 11/1981 | Hirayama et al. | 260/22 CQ |
| 4,497,933 A | 2/1985 | Gorzinski et al. | 524/604 |
| 4,906,684 A | 3/1990 | Say | 524/548 |
| 5,296,530 A * | 3/1994 | Bors et al. | 524/558 |
| 5,426,129 A * | 6/1995 | Emmons et al. | 522/6 |
| 5,559,192 A | 9/1996 | Bors et al. | 525/300 |
| 5,767,199 A | 6/1998 | Bors et al. | 525/153 |
| 5,807,922 A | 9/1998 | Thames et al. | 524/725 |
| 5,994,457 A | 11/1999 | Stanger et al. | 524/800 |
| 6,001,913 A | 12/1999 | Thames et al. | 524/398 |
| 6,174,948 B1 * | 1/2001 | Thames et al. | 524/398 |
| 6,203,720 B1 | 3/2001 | Thames et al. | 252/182.12 |
| 6,235,916 B1 | 5/2001 | Thames et al. | 554/219 |
| 6,242,528 B1 | 6/2001 | Clark et al. | 524/560 |
| 2001/0021739 A1 | 9/2001 | Thames et al. | 524/400 |

FOREIGN PATENT DOCUMENTS

| | | | |
|---|---|---|---|
| EP | WO97/26303 | 7/1997 | C09D/5/02 |
| EP | WO00/56826 | 9/2000 | C09D/175/04 |
| EP | WO01/44380 | 6/2001 | C09D/4/02 |

OTHER PUBLICATIONS

US 5,484,859, 1/1996, Bors et al. (withdrawn)
"Surface Coatings–Raw Materials and Their Usage," vol. I, Chapman & Hall, Chapter 33, pp 592–606 (1993).
G.R. O'Shea, CasChem, XP002236950, entitled Castor Oil and its Chemistry, dated Mar. 24, 2003 the whole document.
Copy of the International Search Report for PCT/US 02/39877, filed Dec. 12, 2002.

\* cited by examiner

*Primary Examiner*—Peter D. Mulcahy
*Assistant Examiner*—Satya Sastri
(74) *Attorney, Agent, or Firm*—Michael F. Morgan

(57) ABSTRACT

A composition comprising a polymer, wherein the polymer comprises at least one of: i) a blend of a first polymer comprising a reaction product of acetoacetoxyethyl (meth) acrylate monomer and a second polymer comprising a reaction product of castor oil (meth)acrylate monomer, and ii) a third polymer comprising a reaction product of acetoacetoxyethyl (meth)acrylate monomer and castor oil (meth) acrylate monomer. These polymer compositions can be cured by at least one of auto-oxidation and actinic radiation. Optionally, at least a portion of the acetoacetoxyethyl (meth) acrylate moieties in the polymer can be converted to a corresponding enamine by reaction with at least one of ammonia and an amine.

39 Claims, No Drawings

CROSSLINKING SYSTEMS FOR ACRYLIC LATEX FILMS

FIELD OF THE INVENTION

The present invention relates to compositions comprising reaction products. The reaction products comprise acetoacetoxyethyl (meth)acrylate moieties and castor oil (meth)acrylate moieties.

BACKGROUND OF THE INVENTION

Traditionally, polymeric compositions that were to be formed into films or other materials were solvent based. The solvent facilitated the film formation and drying of the polymeric compositions so that the polymer could be cured. The trend is to move away from solvent based polymeric compositions to water based polymeric compositions.

A problem with curing water based polymeric compositions is that, in the absence of solvent, heat is required so that the polymers can cure. The application of heat requires the consumption of energy, which can increase the cost of curing the polymeric composition. In some applications, it is desired for films to cure at ambient temperature. Therefore, it is desirable to find polymers that can be cured by auto-oxidation or even radiation by actinic light.

Examples of auto-oxidative polymers that have been discovered to date can be found in U.S. Pat. No. 6,242,528; U.S. Pat. No. 6,235,916; U.S. Pat. No. 6,203,720; U.S. Pat. No. 6,174,948; U.S. Pat. No. 6,001,913; U.S. Pat. No. 5,767,199; U.S. Pat. No. 5,484,849; U.S. Pat. No. 4,906,684; WO 01/44380; and WO 00/56826.

SUMMARY OF THE INVENTION

A composition comprising a polymer, wherein the polymer comprises at least one of: a) a blend of a first polymer comprising a reaction product of acetoacetoxyethyl (meth)acrylate monomer and a second polymer comprising a reaction product of castor oil (meth)acrylate monomer, and b) a third polymer comprising a reaction product of acetoacetoxyethyl (meth)acrylate monomer and castor oil (meth)acrylate monomer.

Additionally, a method comprising: a) applying the composition to a substrate, and b) curing the composition by at least one of auto-oxidation and actinic radiation; wherein when the composition is cured by auto-oxidation, optionally a drier is added to the composition prior to applying, and wherein when the composition is cured by actinic radiation, optionally an actinic radiation curing agent is added to the composition prior to applying.

DETAILED DESCRIPTION

The present invention relates to a composition comprising a polymer. The polymer comprises at least one of: a) a blend of a first polymer comprising a reaction product of acetoacetoxyethyl (meth)acrylate monomer and a second polymer comprising a reaction product of castor oil (meth)acrylate monomer, and b) a third polymer comprising a reaction product of acetoacetoxyethyl (meth)acrylate monomer and castor oil (meth)acrylate monomer.

The structures of the acetoacetoxyethyl (meth)acrylate monomer and the castor oil (meth)acrylate monomer (rininoleic acid methyl ester (meth)acrylate) are given below.

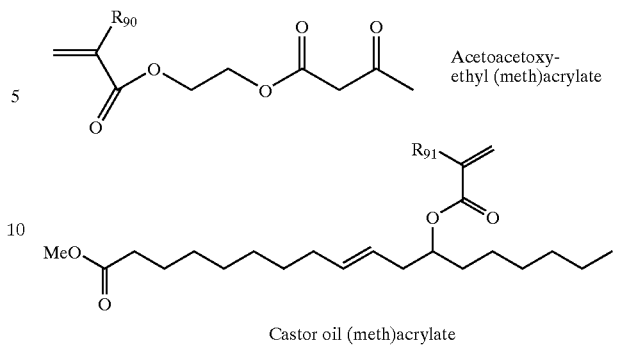

wherein $R_{90}$ is H or $CH_3$ and $R_{91}$ is H or $CH_3$.

The acetoacetoxyethyl (meth)acrylate polymer or the castor oil (meth)acrylate polymer can each be a homopolymer, or either polymer may further comprise comonomers in their reaction products. The polymer that is a reaction product of acetoacetoxyethyl (meth)acrylate monomer and the castor oil (meth)acrylate monomer can be a copolymer of these two monomers, or it can further comprise comonomers in its reaction product. Additionally, the polymer compositions of the present invention may further comprise an additional polymer to form a blend of polymers. The additional polymer can include polymers that are reaction products of the below listed monomers.

Additionally, at least a portion of the acetoacetoxyethyl (meth)acrylate moieties in the polymer can be reacted with ammonia, an amine, or combinations of thereof to convert the acetoacetoxyethyl (meth)acrylate moiety into a corresponding enamine.

Comonomers suitable for the reaction products of the present invention include all monomers that can be reacted with acetoacetoxyethyl (meth)acrylate monomer or the castor oil (meth)acrylate monomer to form an aqueous dispersion polymer. Such monomers can be any ethylenically unsaturated monomer that can be polymerized by a free-radical mechanism. Suitable examples of these include, but are not limited to, (meth)acrylates, hydroxyl containing (meth)acrylates, vinyl aromatics, vinyl halides, vinylidene halides, esters of vinyl alcohol and $C_1$–$C_{18}$ monocarboxylic acids, esters of allyl alcohol and $C_1$–$C_{18}$ monocarboxylic acids, ethylenically unsaturated monomers containing at least one carboxylic acid group, salts of ethylenically unsaturated monomers containing at least one carboxylic acid group, anhydrides of ethylenically unsaturated dicarboxylic acids, nitrites of ethylenically unsaturated carboxylic acids, ethylenically unsaturated monomers containing at least one sulfonic acid group, salts of ethylenically unsaturated monomers containing at least one sulfonic acid group, ethylenically unsaturated monomers containing at least one amide group, dienes, alkyds, nitrogen-containing adhesion monomers, glycidyl esters of ethylenically unsaturated monomers, vinyl esters of the formula $CH_2$=CH—O—(CO)—C—$(R_{100})_3$ wherein $R_{100}$ is an alkyl (sold under the trade name VEOVA™ by Shell), alkylaminoalkyl group-containing (meth)acrylic monomers, alkyl esters of (meth)acrylic acid containing an ether bond in the alkyl, urethane esters of (meth)acrylic acid, urea esters of (meth)acrylic acid, vinyl monomers, isocyanate esters of (meth)acrylic acid, carbonyl containing monomers, monomers containing hydrolyzable Si-organic bonds, vinyl esters of neo acids (such as those sold under the trade name EXXAR™ NEO 10 and NEO 12 from Exxon), enamines, alkyl crotonates, phosphate (meth)acrylates, and (meth)acryloxy benzophenones.

The (meth)acrylates are reaction products of ethylenically unsaturated carboxylic acids and $C_1$–$C_{18}$ alcohols. Examples of (meth)acrylates include, but are not limited to, methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, nonyl (meth)acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth)acrylate, norbornyl (meth)acrylate, 4-tertbutylcyclohexyl (meth)acrylate, 3,3,5-trimethylcyclohexyl (meth)acrylate, dimethyl maleate, n-butyl maleate, alkylene glycol di(meth)acrylates, ethylene glycol di(meth)acrylate, 1,3-butylene glycol di(meth)acrylate, 1,4-butylene glycol di(meth)acrylate, propylene glycol (meth)acrylate, 1,6-hexanediol di(meth)acrylate, dipropylene glycol di(meth)acrylate, tripropylene glycol di(meth)acrylate, trimethylolpropane tri(meth)acrylate, cyclopentadienyl (meth)acrylate, carbodiimide (meth)acrylate, t-butylaminoethyl (meth)acrylate, 2-t-butylaminoethyl (meth)acrylate, and N,N-dimethylaminoethyl (meth)acrylate.

Examples of hydroxyl containing (meth)acrylates include, but are not limited to, 2-hydroxyethyl (meth)acrylate, hydroxypropyl (meth)acrylates, and hydroxybutyl (meth)acrylates.

Examples of ethylenically unsaturated monomers containing at least one carboxylic acid group include, but are not limited to, (meth)acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicarboxylic acid, and 1,3-cyclohexanedicarbocylic acid.

Examples of anhydrides of ethylenically unsaturated dicarboxylic acids include, but are not limited to, maleic anhydride, succinic anhydride, phthalic anhydride, tetrahydrophthalic anhydride, hexahydrophthalic anhydride, tetrabromophthalic anhydride, trimellitic anhydride, pyromellitic anhydride, and 1,4,5,6,7,7-hexachloro-5-norbornene-2,3-dicarboxylic anhydride.

Examples of esters of ethylenically unsaturated monomers containing at least one carboxylic acid group include, but are not limited to, methyl hydrogen fumarate, benzyl hydrogen maleate, butyl hydrogen maleate, octyl hydrogen itaconate, dodecyl hydrogen citraconate, butyl fumarate, octyl fumarate, octyl maleate, dibutyl maleate, and dioctyl maleate.

Examples of esters of vinyl alcohol and $C_1$–$C_{18}$ monocarboxylic acids include, but are not limited to, vinyl acetate, vinyl acetoacetate, t-butylacetoacetate, ethylacetoacetate, vinyl propionate, vinyl n-butyrate, vinyl heptanoate, vinyl perlogonate, vinyl 3,6-dioxaheptanoate, vinyl 3,6,9-trioxanundecanote, vinyl laurate, and vinyl stearate. Examples of esters of allyl alcohol and $C_1$–$C_{18}$ monocarboxylic acids include, but are not limited to, allyl acetate, allyl propionate, allyl (meth)acrylate, allyl n-butyrate, allyl laurate, allyl stearate, diallyl maleate, and diallyl fumarate.

Examples of suitable nitriles of ethylenically unsaturated carboxylic acids include, but are not limited to, acrylonitrile and methacrylonitrile. Examples of vinyl aromatics include, but are not limited to, styrene, α-methyl styrene, o-chlorostyrene, chloromethyl styrene, α-phenyl styrene, styrene sulfonic acid, salts of styrene sulfonic acid, para-acetoxystyrene, divinylbenzene, diallyl phthalate, vinyl toluene, and vinyl naphthalene. Examples of dienes include, but are not limited to, butadiene, isoprene, and chloroprene.

Examples of unsaturated monomers containing at least one sulfonic acid group include, but are not limited to, vinyl sulfonic acid, arylsulfonic acid, sulfopropyl acrylate, (Meth) acryloyloxynaphthalenesulfonic acid, 2-acrylamido-2-methylpropanesulfonic acid, and acryloyloxybenzenesulfonic acid.

Examples of unsaturated monomers containing at least one amide group include, but are not limited to, (meth)acrylamide, dimethyl (meth)acrylamide, N-alkyl (meth)acrylamide, N-butylacrylamide, tetramethylbutyl-acrylamide, N-alkylol (meth)acrylamide, N-methylol (meth)acrylamide, N-octyl acrylamide, methylene bis acrylamide, diacetoneacrylamide, ethyl imidazolidon (meth)acrylate, and N,N-dimethylaminopropylmethacrylamide.

Examples of alkyds include, but are not limited to, reaction products of mono- and polycarboxylic acids with mono- and polyhydroxy-functional alcohols and oils or fatty acids. The oil can be either vegetable or animal. Suitable oils and fatty acids include, but are not limited to, canola oil, corn oil, cottonseed oil, fish oil, safflower oil, sunflower seed oil, rapeseed oil, linseed oil, wood oil, tung oil, lard, palm kernel oil, peanut oil, perilla oil, safflower oil, tallow oil, walnut oil, oiticica oil, soybean oil, ricinous oil, dehydrated ricinous oil, coconut oil, dehydrated coconut oil, castor oil, lesquerella oil, epoxidized linseed oil, epoxidized soybean oil, vernonia oil, tobacco seed oil, tall oil fatty acid, soybean oil fatty acid, rapeseed oil fatty acid, stearic acid, 12-hydroxystearic acid, octylic acid, oleic acid, lauric acid, myristic acid, palmitic acid, oleic acid, eleostearic acid, linoleic acid, linolenic acid, tallow acid, linseed acid, crotonic acid, versatic acid, coconut acid, rosin acid, neodecanoic acid, neopentanoic acid, isostearic acid, and cottonseed acid. Further examples of alkyds can be found in U.S. Pat. Nos. 3,894,978; 3,979,346; 4,299,742; 4,301,048; 4,497,933, and 6,242,528, all of which are incorporated herein by reference.

Examples of the dihydrazides of $C_2$–$C_{10}$ aliphatic dicarboxylic acids include, but are not limited to, dihydrazides of oxalic acid, malonic acid, succinic acid, glutaric acid, adipic acid, and sebacic acid.

As used throughout this specification and claims, nitrogen-containing adhesion monomers are free-radically polymerizable monomers that have at least one of an amino group, a ureido group, a urea group, a thiourea group, and a N-heterocyclic group. Examples of nitrogen-containing adhesion monomers include, but are not limited to, ureido (meth)acrylates, (meth)acrylates with at least one of urea and thiourea in the side chains, acrylic allophanes, aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethylpropyl acrylate and methacrylate, 2-N-morpholinoethyl acrylate and methacrylate, 2-N-piperidinoethyl acrylate and methacrylate, N-(3-dimethylaminopropyl)acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole and also monoethylenically unsaturated derivatives of ethyleneurea, such as N-(2-

(meth)acryloyloxyethyl)ethyleneurea, N-(β-acrylamidoethyl)ethyleneurea, N-2-(allylcarbamato)aminoethylimidazolidinone, N-vinylethyleneurea, N-(3-allyloxy-2-hydroxypropyl)aminoethylethyleneurea, N-vinyloxyethyleneurea, N-methacryloyloxyacetoxyethylethyleneurea, N-(acrylamidoethylene)ethyleneurea, N-(methacrylamidoethylene)-ethyleneurea, 1-(2-methacryloyloxyethyl)imidazolin-2-one, and N-(methacrylamidoethyl)ethyleneurea.

Examples of carbonyl-containing monomers include, but are not limited to, acrolein and methacrolein.

Examples of the monomers containing hydrolyzable Si-organic bonds include, but are not limited to, vinyl silanes, methacryloyloxypropyltrimethoxysilane, vinyltrimethoxysilane, methyltrimethoxysilane, propyltrimethoxysilane, vinyl tris (2 methoxyethoxy silane), vinyl triisopropoxysilane, and 3-amninopropyltrimethoxysilane.

Examples of the phosphate (meth)acrylates include, but are not limited to, sodium phosphate (meth)acrylate, alkylester phosphate (meth)acrylate, and ethoxylated alkylester phosphate (meth)acrylate.

Other vinyl monomers include, but are not limited to, 1,4-butanediol bisacrylate, vinyl acetoacetamide, vinyl 1,3-diketone, vinyl pyrrolidone, vinyl pyridine, vinyl pyrazine, vinyl piperadiene, vinyl piperidone, vinyl pyrimidine, vinyl pyrrole, vinyl imidazole, vinyl caprolactam, vinyl oxazole, vinyl thiazole, vinyl morpholine, triallyl cyanurate, glycidyl (meth)acrylate, 3-isopropenyl-α-α-dimethylbenzyl isocyanate, ethylene, and propylene.

Additionally, monomers of the following structure (I) can be included in the reaction products of the present invention. More information with regard to these monomers can be found in U.S. Pat. Nos. 6,235,916 and 6,203,720, the disclosures of each are incorporated herein by reference, and in International Publication No. WO 01/44380, which claims priority to U.S. Ser. No. 09/460,946 filed on Dec. 14, 1999, the disclosures of each are incorporated herein by reference.

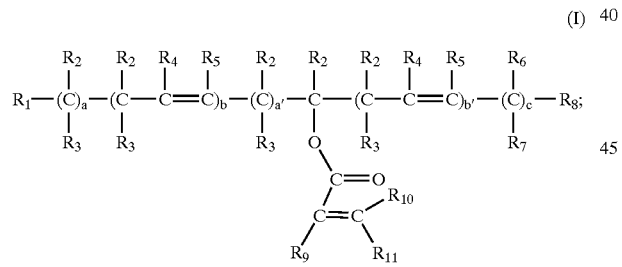

(I)

wherein
(a) $R_1$, $R_2$, $R_3$, $R_4$, $R_5$, $R_6$, and $R_7$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;
(b) $R_8$ is selected from the group consisting of:
—CN;
—COOR;
—$CH_2OH$;
—$CH_2OR$;
—CONR'R"; and
—$CH_2NR'R"$;
wherein
(i) R is selected from the group consisting of:
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms;
linear or branched alkyl and fluoroalkyl groups having the formula $C_nH_xF_y$, wherein n is an integer from 1 to 10, x and y are integers from 0 to 2n+1, and the sum of x and y is 2n+1; and
a multifunctional moiety having the structure (II) or (III):

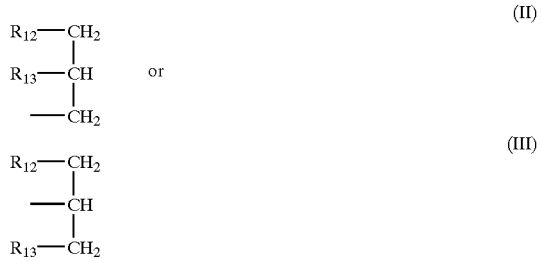

wherein $R_{12}$ and $R_{13}$ are the same or different and are independently selected from the group consisting of:
a substituted or unsubstituted, saturated or unsaturated fatty acid chain; acrylic and substituted acrylic;
a linear or branched alkyl or alkenyl carboxylic acid moiety having 2 to 30 carbon atoms; and monoalkyl esters of maleic and fumaric acids, wherein alkyl group contains 1 to 4 carbon atoms;
(ii) R', and R" are the same or different and are independently selected from the group consisting of:
hydrogen;
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;
(c) $R_9$, $R_{10}$, and $R_{11}$, are the same or different and are independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1; and (d) a, a', b, b', and c, are integers, wherein a and a' have a value of from 0 to 10, b and b' have a value of 0 to 2 with the proviso that sum of b and b' is 1 or 2, and c has a value of from 0 to 20.

The monomer of structure (I) can have the following structure (IV)

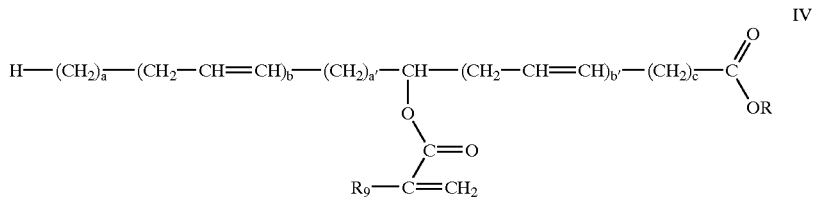

wherein R and $R_9$ are as defined above, however, preferably R is either methyl, multifunctional moieties II or III, or an ethylenically unsaturated carboxylic acid ester of structure IVa.

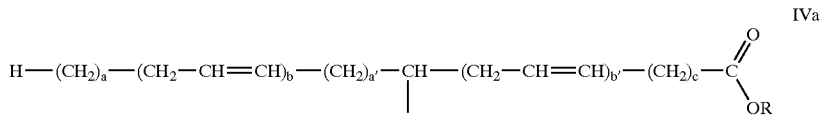

Preferred $R_9$ is either hydrogen or methyl, i.e., ethylenically unsaturated ester in this embodiment is either acrylic or methacrylic ester. a, a', b, b', and c, in structure IV are integers, wherein a and a' have a value of from 2 to 4, b and b' have a value of 0 to 2 with the proviso that the sum of b and b' is 1 or 2, and c has a value of 5 to 12.

When R is the ethylenically unsaturated carboxylic acid ester of formula IVa, dimers (formula IVb), trimers (formula IVc), tetramers (formula IVd) and other oligomers are formed.

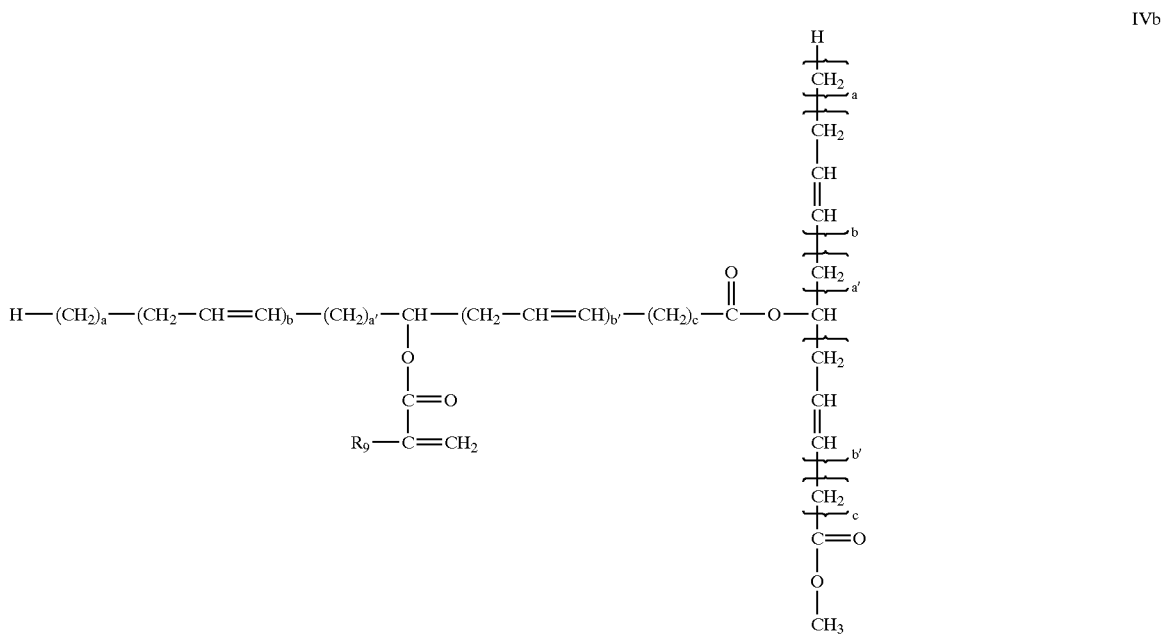

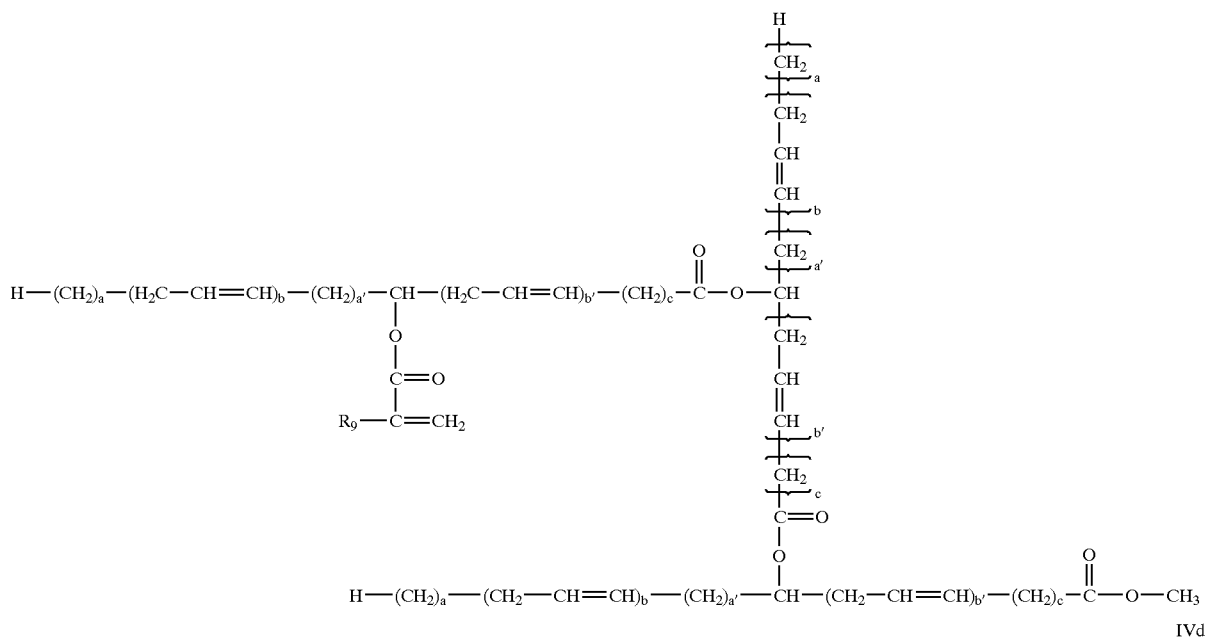
IVc
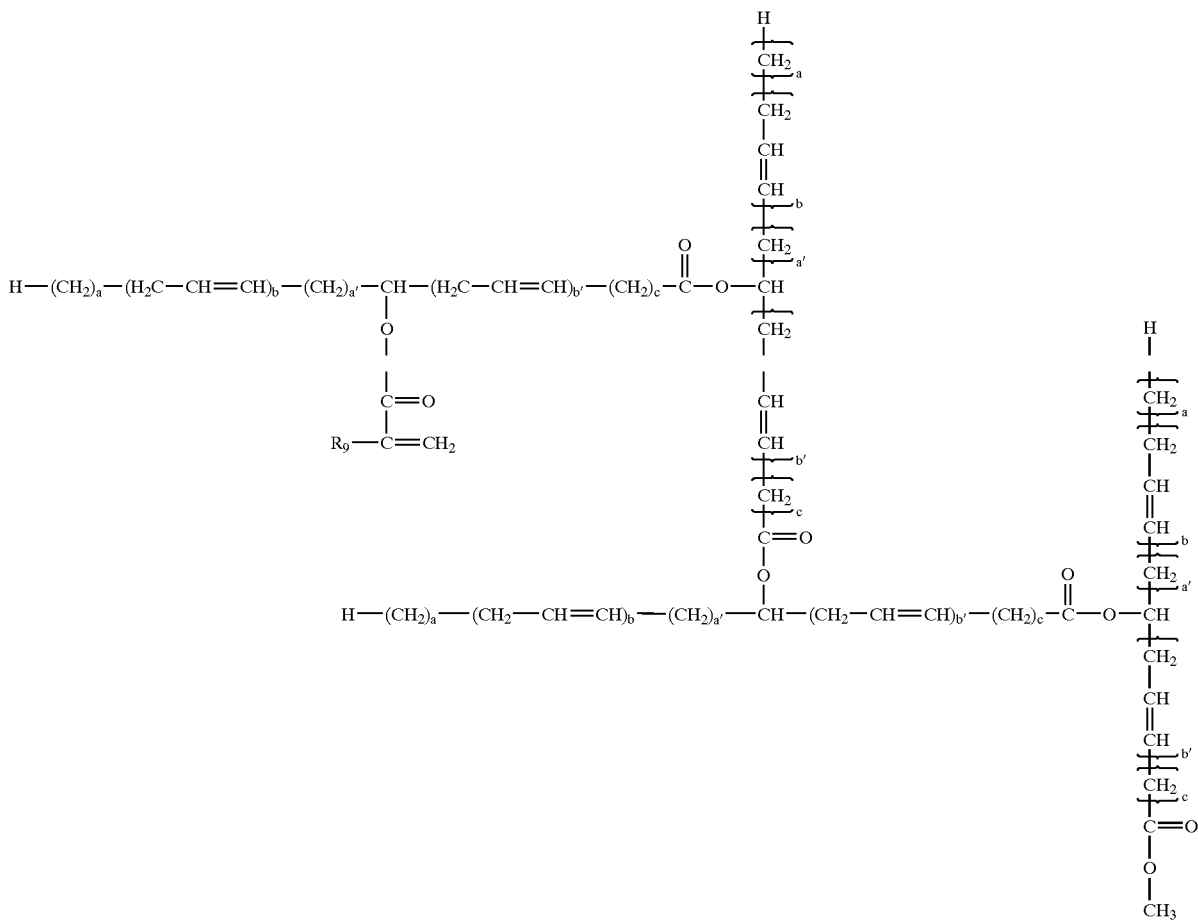
IVd

Additionally, monomers of the following structure (V) can be included in the reaction products of the present invention. More information with regard to these monomers can be found in U.S. Pat. No. 6,174,948, the disclosure of which is incorporated herein by reference.

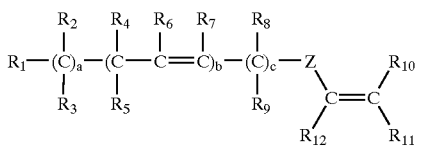

wherein
(a) $R_1$, $R_2$, $R_3$, $R_4$, $R_5$, $R_6$, $R_7$, $R_8$, and $R_9$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;
(b) Z is selected from the group consisting of:
—(CO)—O—;
—(CO)—O—R—O—(CO)—;
—(CO)—O—R—(CO)—O—;
—(CO)—O—R—O—;
—CH$_2$O—;
—CH$_2$O—(CO)—;
—CH$_2$O—R—O—;
—CH$_2$O—R—O—(CO)—;
—CH$_2$O—R—(CO)—O—;
—(CO)—NR'—R—O—(CO)—;
—(CO)—NR'—R—(CO)—O—;
—(CO)—NR'—R—O—;
—CH$_2$NR'—R—O—(CO)—;
—CH$_2$NR'—R—(CO)—O—;
—CH$_2$NR'—R—O—; and
—CH$_2$NR'—(CO)—;
wherein
(i) R is a divalent organic moiety selected from the group consisting of: arylene and substituted arylene group having 6 to 10 carbon atoms; and linear or branched alkylene and fluoroalkylene groups having the formula $C_nH_xF_y$, wherein n is an integer from 1 to 10, x and y are integers from 0 to 2n, and the sum of x and y is 2n; and
(ii) R' is selected from the group consisting of:
hydrogen;
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;
(c) $R_{10}$, $R_{11}$, and $R_{12}$ are the same or different and are independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1; and
(d) a, b, and c, are integers, wherein a and c have a value of from 0 to 20, and sum of a and c is at least 10, and b has a value of 1 or 2.

Additionally, monomers of the following structure (VI) can be included in the reaction products of the present invention. More information with regard to these monomers can be found in U.S. Pat. No. 6,001,913, the disclosure of which is incorporated herein by reference.

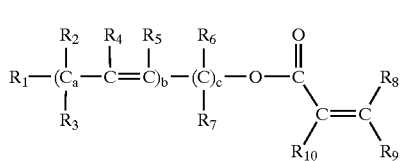

wherein
(a) $R_1$, $R_2$, $R_3$, $R_4$, $R_5$, $R_6$, and $R_7$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;
(b) $R_8$, $R_9$, and $R_{10}$ are the same or different and are independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 8, x and y are integers from 0 to 2n+1, and the sum of x and y is 2n+1; and
(c) a, b, and c, are integers, wherein a and c have a value of from 0 to 20, and sum of a and c is at least 8, and b has a value of 1 or 2.

In the above monomers, references are made to various acids or salts of these acids. When listed, the reference to the acid also includes a reference to its salts. The salts of theses acids include alkali metal salts, alkaline earth metal salts, and ammonium salts.

The polymers of the present invention can be made in a batch polymerization, a seedless semi-batch polymerization, a seeded semi-batch polymerization, or a continuous polymerization. In these polymerizations, the polymers of the present invention can be made as a single stage polymer, a gradient or power-feed polymer, or they can be made as a multiple stage polymer. When made as a multiple stage polymer, the total amount of the acetoacetoxyethyl (meth) acrylate moieties or the castor oil (meth)acrylate moieties in the resulting polymer can be split between the first stage and succeeding stages. The amount of acetoacetoxyethyl (meth) acrylate moieties and castor oil (meth)acrylate moieties in any given stage can be any amount such that desired properties in the polymer are obtained.

Generally, based on the total number of monomeric moieties in all of the polymers in a composition of the present invention, the total number of all castor oil (meth) acrylate moieties in all polymers ranges from about 1% to about 50%, and preferably from about 2% to about 25%. The total number of all acetoacetoxyethyl (meth)acrylate moieties in all polymers ranges from about 1% to about 60%, and preferably from about 2% to about 40%.

Generally, the ratio of the number of all castor oil (meth) acrylate moieties in all of the polymers in a composition to the number of all acetoacetoxyethyl (meth)acrylate moieties in all of the polymers in the composition ranges from about 0.1:1 to about 10:1, and preferably from about 0.2:1 to about 5:1.

While the above ranges given are general ranges, any amount of castor oil (meth)acrylate or acetoacetoxyethyl (meth)acrylate can be provided in the compositions of the present invention.

The reaction to form the polymers of the present invention can be an emulsion polymerization reaction in which the monomers are emulsified in water with a surface active agent or stabilized by a protective colloid and reacted using emulsion polymerization techniques known in the art. The resulting product of the emulsion polymerization is an aqueous polymer dispersion, also called a latex.

The reaction can be started with any initiator. In the reaction, additional materials that are used in emulsion polymerizations can be included. Examples of additional materials include, but are not limited to, electrolytes, pH adjusting agents, dispersing agents, and chain transfer agents. At the end of the reaction, typically a redox system, which includes an oxidizing agent and a reducing agent, is added to the reaction product to drive the reaction to further completion to reduce the amount of residual monomers. Alternatively, any system that reduces residual monomer content can be used. Examples include, but are not limited to, stripping with steam, vacuum, use of adsorbent materials, and combinations thereof.

Any temperature that allows the monomers to react to form a polymer can be used as a reaction temperature. Generally, emulsion polymerization reactions have a reaction temperature that ranges from about 3° C. to about 130° C.

Examples of surface active agents (surfactants) that can be used in the present invention include anionic, cationic, nonionic, amphoteric surfactants, and mixtures thereof.

Examples of anionic surfactants include, but are not limited to, organosulfates and sulfonates, e.g., sodium and potassium alkyl, aryl, and arylalkyl sulfates and sulfonates, such as sodium 2-ethylhexyl sulfate, potassium 2-ethylhexyl sulfate, sodium nonyl sulfate, sodium lauryl sulfate, potassium methylbenzene sulfonate, sodium dodecylbenzene sulfonate, potassium toluene sulfonate, and sodium xylene sulfonate; higher fatty alcohols, e.g., stearyl, lauryl, etc., which have been ethoxylated and sulfonated; dialkyl esters of alkali metal sulfosuccinic acid salts, such as sodium diamyl sulfosuccinate, sodium dioxtyl sulfosuccinate, and sodium dioctyl sulfosuccinate, formaldehyde-naphthalene sulfonic acid condensation products; and alkali metal salts, partial alkali metal salts, free acids of complex organic phosphate esters, and sodium salt of a fatty alcohol ether sulfate (EMULPHOR FAS 30 from BASF AG or DISPONIL™ FES 77 from Cognis, Inc.).

Examples of cationic surfactants include, but are not limited to, alkylamine salts such as laurylamine acetate, quaternary ammonium salts such as lauryl trimethyl ammonium chloride and alkyl benzyl dimethylammonium chlorides, and polyoxyethylenealkylamines.

Examples of amphoteric surfactants include, but are not limited to, alkylbetaines such as lauryl-betaine.

Examples of nonionic surfactants include, but are not limited to, polyethers, e.g., ethylene oxide and propylene oxide condensates that include straight and branched chain alkyl and alkylaryl polyethylene glycol and polypropylene glycol ethers and thioethers; alkylphenoxypoly (ethyleneoxy) ethanols having alkyl groups containing from about 7 to about 18 carbon atoms and having from about 4 to about 240 ethyleneoxy units, such as heptylphenoxypoly (ethyleneoxy) ethanols, nonylphenoxypoly (ethyleneoxy) ethanols; the polyoxyalkylene derivatives of hexitol including sorbitans, sorbides, mannitans and mannides; partial long-chain fatty acids esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, the base being formed by condensing propylene oxide with propylene glycol; sulfur containing condensates, e.g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long-chain carboxylic acids, such as lauric, myristic, palmitic, or oleic acids or mixtures of acids, such as tall oil fatty acids; ethylene oxide derivatives of long-chain alcohols such as octyl, decyl, lauryl, or cetyl alcohols; and ethylene oxide/propylene oxide copolymers sold under the tradename PLURONIC™ from BASF AG. Another nonionic surfactant is an organosilanol derivative of tung oil, or linseed oil, or high erucic acid rapeseed oil. These surfactant compositions particularly feature high surface activity in forming stable emulsions of organic/water of various difficult to emulsify materials as compared with conventional emulsifying agents. These silanol-based surfactant compositions are described in U.S. Pat. No. 5,807,922.

Another class of surfactants that can be used are those that are copolymerizable with the monomers described above.

In emulsion polymerization, the amount of surfactants in the emulsion polymerization reaction range from about 0.01 to about 10 weight percent, preferably about 0.2 to about 5 weight percent based on the total weight of monomers and water.

Initiators that can be used in a reaction to prepare the polymers of the present invention include any oxidizer. Suitable oxidizers include, but are not limited to persulfates, ammonium persulfate, sodium persulfate, potassium persulfate, peroxides, benzoyl peroxide, t-butyl hydroperoxide, hydrogen peroxide, cumic hydroperoxide, and azobisisobutyronitrile. Additionally, reducing agents can be used in combination with the oxidizers. Suitable reducing agents are listed below.

Electrolytes that can be included in the reaction include, but are not limited to, ammonium, alkali metal, and alkaline earth metal carbonates.

Chain transfer agents that can be included in the reaction include, but are not limited to, mercaptans, such as t-dodecyl mercaptan.

Oxidizers that can be included in the redox system include, but are not limited to, peroxides, t-butyl hydroperoxide, hydrogen peroxide, pinane hydroperoxide, dibenzoyl peroxide, cumol hydroperoxide, peroxodisulfuric acid, salts of peroxodisulfuric acid, agents that donate oxygen with free radical formation, alkali metal chlorates, alkali metal perchlorates, transition metal oxide compounds, potassium permaganate, manganese dioxide, lead oxide, lead tetraacetate, iodobenzene. Reducing agents that can be included in the redox system include, but are not limited to, sodium formaldehyde sulfoxylate, erythorbic acid, bisulfites, sodium metabisulfite, sodium bisulfite, adducts of a 3 to 8 carbon ketone with the bisulfite ion, adducts of a 3 to 8 carbon ketone with sulfurous acid, reducing sugars, ascorbic acid, sulfinic acids, hydroxymethane-sulfinic acid, alkane sulfinic acids, isopropane sulfinic acid. Additional redox systems are described in U.S. Pat. No. 5,994,457, which is incorporated herein by reference.

Additional polymers that can be blended with the polymer compositions of the present invention include, but are not limited to, (meth)acrylates, styrenics, styrene-butadienes, polyurethanes, polyethers, polyesters, melamine-formaldehyde polymers, vinyl halides, vinylidene halides, poly(ethyleneimines), and poly(vinyl amines).

Before the addition of post reaction additives to prepare specific desired compositions, the reaction products (the aqueous polymer dispersions) of the present invention generally have a total solids content of from about 30% to about 70% and a pH from about 2 to about 7. The particle size can generally range from about 30 nm to about 500 nm. The particle size distribution can be uni- or multi-modal.

The compositions of the present invention may further contain additional additives. The additives can be any additive that may be generally included with an emulsion polymerization reaction product or any additive that may be used to make a specific composition. Further additives include, but are not limited to, surfactants, wetting agents, protective colloids, fillers, coloring agents, antiseptics, biocides, dispersing agents, thickening agents, thixotropic agents, antifreezing agents, pH adjusting agents, corrosion inhibitors, ultraviolet light stabilizers, crosslinking promoters, and antioxidants.

Examples of surfactants and wetting agents include, but are not limited to, the surfactants listed above, sulfosuccinates, fluorinated surfactants, and silicone surfactants.

Examples of protective colloids are partially and fully hydrolyzed polyvinyl alcohol, hydroxyethyl cellulose, hydroxymethyl cellulose, ethylhydroxyethyl cellulose, carboxymethyl cellulose, ethoxylated starch derivatives, polyacrylic acid, alkali metal polyacrylates, polyacrylamide, poly (methyl vinyl ether/maleic anhydride), polyvinylpyrrolidone, water soluble starch, glue, gelatin, water soluble alginates, guar, gum arabic, and gum tragacanth. The amount of protective colloids used in the composition varies depending upon the intended application and generally ranges from about 0.1 weight percent to about 2 weight percent based on the total weight of the composition.

Examples of fillers include talc, calcium carbonate, diatomaceous earth, mica, kaolin, barium sulfate, magnesium carbonate, Aerosil, vermiculite, graphite, alumina, silica, and rubber powder. Coloring agents such as titanium dioxide and carbon black can also be used as the fillers. The amount of the filler generally ranges from about 5 weight percent to about 50 weight percent based on the total weight of the composition of the present invention.

Various organic pigments and inorganic pigments may be broadly used as the coloring agents, but non-toxic anticorrosive pigments are preferred. Examples of such pigments are phosphate-type anticorrosive pigments such as zinc phosphate, calcium phosphate, aluminum phosphate, titanium phosphate, silicon phosphate, and ortho-and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate. Also, any color pigment, effect pigment, or color and effect pigment may be used. The amount of the coloring agent used may also be properly selected based on the end-use application of the compositions of the present invention.

Examples of the antiseptics are pyrrole compounds, imidazole compounds, thiazole compounds, pyridine compounds and organic halogen compounds. The amount of the antiseptic can be suitably selected, and is, for example, up to about 4 percent by weight based on the total weight (as solids content) of the composition.

Examples of the biocides, which are used either as wet-state protectors or as film protectors of a coating composition, are a wide variety of bactericides, fungicides or algicides, and include, but are not limited to, zinc oxide, cuprous oxide, organotin pigments, copolymers of organotin esters of methacrylic acid with acrylates, tributyl tin oxide, and mixtures thereof. Other examples of biocides particularly useful as wet-state protectors are oxazoladines, organosulfurs, and benzisothiazolins. Any general toxic agent may be suitable as a biocide.

The dispersing agents include, but are not limited to, inorganic dispersing agents such as sodium salts of polycarboxylic acids, sodium or ammonium salts of fused naphthalene sulfonate, polyoxyalkylene alkyl ethers of phenol ether, sorbitan fatty acid esters, polyoxyalkylene fatty acid esters, glycerin fatty acid esters, polyoxyethylene styrene phenol, sodium tripolyphosphate and sodium hexametaphosphate. As described above, organosilanol derivatives of tung oil, or linseed oil, or high erucic acid rapeseed oil that are useful as surfactants are also suitable as dispersing agents. The amount of the dispersing agent generally ranges up to about 10 weight percent based on the total weight of the composition.

The thickening and thixotropic agents may be one and the same or different and may be the same as the protective colloids referred to above. Examples of thickening or thixotropic agents are polyvinyl alcohol, cellulose derivatives such as hydroxyethyl cellulose, hydroxypropyl cellulose and carboxymethyl cellulose salt, polyether compounds, urethane modified polyether compounds, polycarboxylic acid compounds, sodium salts of polycarboxylic compounds, polyvinylpyrrolidone, polyoxyethylene derivatives such as polyethylene glycol ether and polyethylene glycol distearate, sodium alginate and inorganic materials such as sodium silicate and bentonite. The amounts of the thickening or the thixotropic agents can be properly chosen depending upon the type of end-application of the composition of the present invention.

Examples of the pH adjusting agents include, but are not limited to, sodium hydroxide, potassium hydroxide, sodium hydrogen carbonate, ammonium hydroxide, ammonia, amines, triethanolamine, and 3-dimethylaminoethanol. The amount of the pH adjusting agent is selected such that the composition has a desired pH.

Examples of the crosslinking promoters include, but are not limited to, carbodiimides.

When the compositions of the present invention are formed into a film, they can be cured by at least one of auto-oxidation and actinic radiation. Additionally, heat can be used to cure the films.

A film can be provided by a method comprising: a) applying the composition to a substrate, and b) curing the composition by at least one of auto-oxidation and actinic radiation, wherein when the composition is cured by auto-oxidation, a drier is optionally added to the composition prior to applying, and wherein when the composition is cured by actinic radiation, optionally an actinic radiation curing agent is added to the composition prior to applying.

When the compositions of the present invention are formed into a film and are curable by auto-oxidation, a drier can be added to the compositions to facilitate curing. Driers are materials that promote or accelerate curing or hardening of the polymers when they are applied as a film.

Examples of driers that can be included in the composition of the present invention include, but are not limited to, neutral soaps of the formula $(R_x—COO^-)_2M^{2+}$ or $(R_x—COO^-)_3M^{3+}$; acid soaps of the formula $(R_x—COO^-)_2M^{2+} \cdot R_x—COOH$ or $(R_x—COO^-)_3M^{3+} \cdot R_x—COOH$; basic soaps of the formula $(R_x—COO^-)_2M^{2+} \cdot OH$; organic complexed or mixed soaps of the formula $(R_x—COO^-)(R'_x—COO—)M^{2+}$ or $(R_x—COO^-)(R'_x—COO^-)(R''_x—COO^-)M^{3+}$; inorganic/organic complexed or mixed soaps of the formula $O—M^{2+-O-CO-R}_x$, $Y—O—M^{2+}—O—CO—R_x$, and $O—M^{2+}—O—CO—R_x$; wherein $R_x—COO^-$, $R'_x—COO^-$, and $R''_x—COO^-$ are aliphatic carboxylic acid ions having 6 to 20 carbon atoms, x is an integer from 6 to 20, M=metal ion, and Y=phosphorus or boron. Additionally, driers can be any polyvalent metal containing complex or salt that catalyzes the oxidative curing. Examples are polyvalent metal salts containing cobalt, calcium, manganese, copper, zinc, iron, and zirconium as the cation. Simple salts such as halides, nitrates, and sulfates can be used, but also organic anions, such as acetate, naphthenate, or acetoacetonate, can be used to obtain a more water soluble or water miscible drier.

The commonly used carboxylic acids for forming the metal driers are aliphatic acids, preferably fatty acids. Examples of fatty acids include rosin oil fatty acid, linseed oil fatty acid, and tall oil fatty acid. Naphthenic acids obtained from certain petroleum crudes may also be used for forming the suitable metal driers. The naphthenic acids generally contains an average of 12–14 carbon atoms having a cyclopentane nucleus with the carboxyl group terminating a side chain and with one to three methylenic groups between the carboxyl and the nucleus. Various other synthetic acids having 8 to 10 carbon atoms are also used to form the metal driers, and include, for example, 2-ethylhexanoic acid and neodecanoic acids.

Examples of metals that can be used in the driers include, but are not limited to, cobalt, zirconium, manganese, calcium, lead, zinc, copper, barium, vanadium, cerium, iron, potassium, strontium, aluminum, bismuth, and lithium. Particularly preferred metal driers are aliphatic carboxylic salts of cobalt, manganese, lead, zirconium, calcium, and mixtures thereof. A detailed description of various metal driers may be found in "Surface Coatings—Raw Materials and Their Usage," Vol. I, Chapman & Hall, Chapter 33, pp 592–606 (1993), which is incorporated herein by reference, and in U.S. Pat. No. 5,559,192, which is incorporated herein by reference.

Additionally, in combination with a drier, a volatile stabilizer can be included. Examples of volatile stabilizers include, but are not limited to, ketone oximes and hindered aldehyde oxime. Examples of these include, but are not limited to, methyl ethyl ketone oxime, methyl butyl ketone oxime, 5-methyl-3-heptanone oxime, and cyclohexanone oxime. Volatile stabilizers are generally used at 0.05 to 1% by weight of the composition.

The amount of driers that can be included in the compositions can be any amount that promotes or accelerates curing or hardening of the polymers. Generally, the amount of driers ranges from about 0.01% to about 1% metal content based on the weight of the composition, and preferably from about 0.05% to about 0.5%.

When the compositions of the present invention are formed into a film and are curable by actinic radiation, an actinic radiation curing agent can be added to the compositions to facilitate curing. Actinic radiation curing agents are materials that promote or accelerate curing or hardening of the polymers when they are applied as a film and are radiated with actinic radiation. Preferably, the composition does not contain an actinic radiation curing agent. One type of actinic radiation is UV radiation. Any wavelength of actinic radiation that promotes or accelerates the cure of the polymers can be used. Generally, the wavelength of radiation ranges from about 200 nm to about 500 nm.

Examples of actinic radiation curing agents include, but are not limited to, benzophenone, 4-methylbenzophenone, benzoyl benzoates, phenylacetophenones, 2,2-dimethoxy-2-phenylacetophenone, and amine modified diacrylates.

The amount of actinic radiation curing agents that can be included in the compositions can be any amount that promotes or accelerates curing or hardening of the polymers. Generally, the amount of actinic radiation curing agents ranges from about 0% to about 1% based on the weight of the composition, and preferably from about 0% to about 0.5%.

The combination of acetoacetoxyethyl (meth)acrylate and castor oil (meth)acrylate in a polymer composition can improve the modulus of the polymer when the polymer is formed into a film. The improvement in modulus can be as great as 600% or more.

Uses of the compositions of the present invention include, but are not limited to, coatings, including original equipment manufacture (OEM) automotive coatings, refinish automotive coatings, architectural coatings, paper coatings, textile coatings, industrial coatings, furniture coatings, powder coatings, graphic arts, inks, adhesives, binders, nonwovens, paper saturation, medical applications (such as dentifrice, sutures, and bandages), and construction chemicals. Polymer crosslinking provides chemical and stain resistance in coatings as well improved processability, toughness, and service life in other applications

SPECIFIC EMBODIMENTS OF THE INVENTION

Compositions according to the invention were prepared and then the compositions were formed into films. The films were cured by auto-oxidation and by exposure to actinic radiation. These examples are In the examples below, the following abbreviations are used:

| AA | Acrylic acid |
|---|---|
| AAEM | Acetoacetoxyethylmethacrylate monomer |

-continued

| | |
|---|---|
| BA | n-butyl acrylate |
| CAM | Castor oil acrylate monomer |
| MAA | Methacrylic acid |
| MMA | Methyl methacrylate |
| t-BA | t-butyl acrylate |
| t-BMA | t-butyl methacrylate |

Latex synthesis

To achieve auto-oxidative crosslinking in a latex film the ideal strategy is to have a radical forming functionality in the polymer together with functional groups prone to radical addition. Alternatively, these two functional groups could be on different polymers that would have to be blended in order to get crosslinking. Thus, we prepared latexes with only one functionality, but also ones that comprise both functional groups—those that generate radicals, and those that allow addition of radicals. The model latexes were designed in such a way as to have similar total solids content (40%) and $T_g$.

The following functional groups were employed: As radical forming entities CAM was used. As entities prone to radical addition, ethyl acetoacetate (EAA) and ethyl γ-aminocrotonate (EAC) were used. The EAC containing polymer was generated from the EAA polymer by reaction with $NH_4OH$ as described in U.S. Pat. No. 5,484,849, which is incorporated herein by reference.

The following model latexes were prepared (see Table 1 below): No. 1 without functional monomer, No. 2/No. 7 with each 10 mol % $AAEM/NH_3$ (pH 9.5), No. 9 with 19 mol % $AAEM/NH_3$ (pH 9.5), No. 10 with 6 mol % $AAEM/NH_3$ (pH 9.5) and No. 3/No. 4/No. 12/No. 13 with each 3 mol % CAM, the difference being that No. 3/No. 13 were reacted at 70° C. and No. 4/No. 12 at 50° C. A core-shell latex was synthesized, No. 6, with CAM in the outer (shell) phase. In No. 8 the two functional groups AAEM (11 mol %) and CAM (3 mol %) were combined. The total solids (TS) target was 40% for all samples.

TABLE 1

| ingredient | weight percent | mol percent | ingredient | weight percent | mol percent |
|---|---|---|---|---|---|
| | No. 1 | | | No. 2 | |
| BA | 0.52 | 0.46 | BA | 0.47 | 0.46 |
| MMA | 0.47 | 0.53 | MMA | 0.35 | 0.43 |
| MAA | 0.01 | 0.01 | MAA | 0.01 | 0.02 |
| | | | AAEM | 0.17 | 0.10 |
| solids content | 0.40 | | solids content | 0.40 | |
| Fox $T_g$ (° C.) | 15.6 | | Fox $T_g$ (° C.) | 19.9 | |
| | No. 3 | | | No. 4 | |
| BA | 0.37 | 0.34 | BA | 0.44 | 0.41 |
| MMA | 0.52 | 0.62 | MMA | 0.45 | 0.55 |
| MAA | 0.01 | 0.01 | MAA | 0.01 | 0.01 |
| CAM | 0.10 | 0.03 | CAM | 0.10 | 0.03 |
| solids content | 0.41 | | solids content | 0.41 | |
| Fox $T_g$ (° C.) | 24.1 | | Fox $T_g$ (° C.) | 28.0 | |
| | No. 5 | | | No. 7 | |
| BA | 0.45 | 0.43 | BA | 0.62 | 0.623 |
| MMA | 0.34 | 0.42 | MMA | 0.20 | 0.257 |
| MAA | 0.01 | 0.01 | AA | 0.01 | 0.018 |
| t-BMA | 0.12 | 0.11 | AAEM | 0.17 | 0.102 |
| CAM | 0.08 | 0.03 | | | |
| solids content | material discarded | | solids content | 0.37 | |
| Fox $T_g$ (° C.) | −5.5° C. | | Fox $T_g$ (° C.) | −2.0 | |
| | No. 8 | | | No. 9 | |
| BA | 0.51 | 0.43 | BA | 0.52 | 0.56 |
| MMA | 0.23 | 0.42 | MMA | 0.165 | 0.23 |
| AA | 0.01 | 0.01 | AA | 0.015 | 0.03 |
| AAEM | 0.17 | 0.11 | AAEM | 0.30 | 0.19 |
| CAM | 0.08 | 0.03 | | | |
| solids content | 0.38 | | solids content | 0.37 | |
| Fox $T_g$ (° C.) | 3.0 | | Fox $T_g$ (° C.) | −6.88 | |
| | No. 10 | | | No. 11 | |
| BA | 0.72 | 0.70 | BA | 0.595 | 0.64 |
| MMA | 0.175 | 0.22 | MMA | 0.145 | 0.20 |
| AA | 0.015 | 0.03 | AA | 0.015 | 0.03 |
| AAEM | 0.09 | 0.06 | AAEM | 0.17 | 0.11 |
| | | | CAM | 0.075 | 0.03 |
| solids content | 0.39 | | solids content | 0.39 | |
| Fox $T_g$ (° C.) | −13.89 | | Fox $T_g$ (° C.) | −32.90 | |

TABLE 1-continued

| ingredient | weight percent | mol percent | ingredient | weight percent | mol percent |
|---|---|---|---|---|---|
| | No. 12 | | | No. 13 | |
| BA | 0.54 | 0.52 | BA | 0.53 | 0.52 |
| MMA | 0.36 | 0.44 | MMA | 0.36 | 0.44 |
| MAA | 0.01 | 0.01 | MAA | 0.01 | 0.01 |
| CAM | 0.10 | 0.03 | CAM | 0.10 | 0.03 |
| solids content | 0.37 | | solids content | 0.39 | |
| Fox $T_g$ (° C.) | −20.14 | | Fox $T_g$ (° C.) | −6.97 | |

TABLE 2 two step latex (core-shell latex)

No. 6 (data based on individual steps)

| | Step 1 | | | Step 2 | |
|---|---|---|---|---|---|
| ingredient | weight percent | mol percent | ingredient | weight percent | mol percent |
| BA | 0.56 | 0.50 | BA | 0.29 | 0.32 |
| MMA | 0.43 | 0.49 | t-BA | 0.55 | 0.60 |
| MAA | 0.01 | 0.01 | MAA | 0.01 | 0.02 |
| | | | CAM | 0.15 | 0.06 |
| Theoretical Fox $T_g$ (K) | 267.9 | | Theoretical Fox $T_g$ (K) | 265.6 | |

No. 6 (overall balance)

| monomers split up in two steps | | | combined data | | |
|---|---|---|---|---|---|
| ingredient | weight percent | mol percent | ingredient | weight percent | mol percent |
| BA (1. stage) | 0.45 | 0.41 | BA | 0.51 | 0.47 |
| MMA (1. stage) | 0.34 | 0.41 | MMA | 0.34 | 0.41 |
| MAA (1. stage) | 0.007 | 0.007 | MAA | 0.01 | 0.01 |
| BA (2. stage) | 0.06 | 0.06 | t-BA | 0.11 | 0.10 |
| t-BA (2. stage) | 0.11 | 0.10 | CAM | 0.03 | 0.01 |
| MAA (2. stage) | 0.003 | 0.003 | | | |
| CAM (2. stage) | 0.03 | 0.01 | | | |
| | | | solids content | 0.40 | |
| | | | Fox $T_g$ (° C.) | 7.90 | |

A summary of the latex samples prepared are listed below in Table A.

TABLE A

| Sample | Functionality | wt % (func. group) | % solids | $T_g$ (° C.) |
|---|---|---|---|---|
| No. 1 | -(BA, MMA) | — | 40.3 | 15.6 |
| No. 2 | AAEM/NH$_4$OH | 17 | 39.8 | 19.9 |
| No. 3 | CAM (synth. at 70° C.) | 10 | 40.6 | 24.1 |
| No. 4 | CAM (synth. at 50° C.) | 10 | 41.1 | ca. 28 |
| No. 6 | CAM ("core-shell") | 3 (15 for 2$^{nd}$ step) | 40.0 | 7.9 |
| No. 7 | AAEM/NH$_4$OH | 17 | 36.9 | −2.0 |
| No. 8 | CAM + AAEM/NH$_4$OH | 7.5 CAM + 17 AAEM | 38.0 | 3.0 |
| No. 9 | AAEM/NH$_4$OH | 30 | 37.2 | −6.9 |
| No. 12 | CAM (synth. at 50° C.) | 10 | 37.4 | −20.1 |
| No. 13 | CAM (synth. at 70° C.) | 10 | 38.9 | −7.0 |

Detailed Description of Reactions

General information: The reactions were run as seeded, semi-batch emulsion polymerisations on reactors equipped with a mechanical stirrer. The seed listed for each reaction was the same composition as the monomer emulsion mixture used for the example. The amount of seed was an additional amount beyond the amount of monomer emulsion mixture listed. The following materials were used in the polymerizations. SULFOLE™ 120 t-dodecylmercaptan (from Phillips Petroleum of Bartlesville, Okla.) was used as a chain transfer agent, and TEXAPON™ K 12 PA 15 sodium lauryl sulfate (Cognis Corp., Cincinnati, Ohio) as a 15% aqueous solution and DISPONIL™ FES 77 sodium salt of fatty alcohol ether sulphate (Cognis Corp., Cincinnati, Ohio) as a 30% solution were used as surface active agents.

No. 1: A mixture of 562.3 g water and 48.9 g seed were charged into a reaction vessel, and the mixture was heated to 85° C. From an initiator feed of 29.6 g water and 1.6 g ammonium persulfate, 5% was removed and added to the reaction mixture. After 5 minutes, the remainder of the initiator feed and a monomer emulsion mixture feed (consisting of 415.0 g water, 52.0 g Sodium lauryl sulfate, 7.8 g methacrylic acid, 405.6 g butyl acrylate, 366.6 g methyl methacrylate, 1.6 g t-dodecyl mercaptan, and 3.9 g of a 10% aqueous NaOH solution) were added over 3 hours in separate feeds. After adding 39.0 g water and cooling to 75° C. the dispersion was post-stripped by adding the following two mixtures as two separate feeds over the course of 1 hour: (a) 1.1 g 70% tert-butyl hydroperoxide solution and 30.9 g water and (b) 0.5 g sodium metabisulfite, 0.3 g acetone, and 31.2 g water. The latex was then cooled to room temperature (rt) and filtered.

No. 2: A mixture of 539.5 g water and 48.9 g seed were charged into a reaction vessel, and the mixture was heated to 85° C. From an initiator feed of 29.6 g water and 1.6 g ammonium persulfate, 5% was removed and added to the reaction mixture. After 5 minutes, the remainder of the initiator feed and a monomer emulsion mixture feed (consisting of 418.5 g water, 52.0 g Sodium lauryl sulfate, 7.8 g methacrylic acid, 366.6 g butyl acrylate, 273.0 g methyl methacrylate, 132.6 g AAEM (acetoacetoxyethylmethacrylate), and 1.6 g t-dodecyl mercaptan) were added over 3 hours in separate feeds. After cooling to 75° C. and an addition of 1.35 g of a 29% NH$_4$OH solution, the dispersion was post-stripped by adding the following two mixtures as two separate feeds over the course of 2 hours: (a) 1.1 g 70% tert-butyl hydroperoxide solution and 30.9 g water and (b) 0.5 g sodium metabisulfite, 0.3 g acetone, and 31.2 g water. The latex was cooled to room temperature, subsequently 20 ml of a 29% NH$_4$OH solution was added, and it was filtered. Over the course of three days, another 60 ml 29% NH$_4$OH solution were added (3×20 ml).

No. 3: A mixture of 596.0 g water and 48.9 g seed were charged into a reaction vessel, and the mixture was heated to 70° C. From an initiator feed of 29.6 g water and 1.6 g ammonium persulfate, 5% was removed and added to the reaction mixture. After 5 minutes, the remainder of the initiator feed and a monomer emulsion mixture feed (consisting of 420.3 g water, 52.0 g Sodium lauryl sulfate, 7.8 g methacrylic acid, 288.6 g butyl acrylate, 405.6 g methyl methacrylate, 78.0 g CAM (castor oil acrylate monomer), 1.6 g t-dodecyl mercaptan, and 3.9 g of a 10% aqueous NaOH solution) were added over 4 hours in separate feeds. During the course of the reaction, two samples were taken: after 1.60 h feeding time (TS 21.71%, theoretically 27.65%), and after 3.60 h: (TS 34.95%, theoretically 39.80%). Subsequently, the dispersion was post-stripped by adding the following two mixtures as two separate feeds over the course of 2 hours: (a) 1.1 g 70% tert-butyl hydroperoxide solution and 30.9 g water and (b) 0.5 g sodium metabisulfite, 0.3 g acetone, and 31.2 g water. The latex was then cooled to room temperature and filtered.

No. 4: A mixture of 649.4 g water and 53.3 g seed were charged into a reaction vessel, and the mixture was heated to 50° C. From an initiator feed of 32.3 g water and 1.7 g ammonium persulfate, 5% was removed and added to the reaction mixture. After 5 minutes, the remainder of the initiator feed and a monomer emulsion mixture feed (consisting of 458.0 g water, 56.7 g Sodium lauryl sulfate, 8.5 g methacrylic acid, 374.0 g butyl acrylate, 382.5 g methyl methacrylate, 85.0 g CAM (castor oil acrylate monomer), 1.7 g t-dodecyl mercaptan, and 4.3 g of a 10% aqueous NaOH solution) were added over 4 hours in separate feeds. Subsequently, the dispersion was post-stripped by adding the following two mixtures as two separate feeds over the course of 2 hours: (a) 1.2 g 70% tert-butyl hydroperoxide solution and 33.6 g water and (b) 0.5 g sodium metabisulfite, 0.3 g acetone, and 34.0 g water. The latex was then cooled to room temperature and filtered.

No.5: A mixture of 596.0 g water and 48.9 g seed were charged into a reaction vessel, and the mixture was heated to 70° C. From an initiator feed of 29.6 g water and 1.6 g ammonium persulfate, 5% was removed and added to the reaction mixture. After 5 minutes, the remainder of the initiator feed was added to the reaction mixture over the course of 5 h. Simultaneously, a monomer emulsion feed stream was added over the course of 2 h, consisting of 327.7 g water, 41.6 g Sodium lauryl sulfate, 5.5 g methacrylic acid, 351.0 g butyl acrylate, 265.2 g methyl methacrylate, 1.6 g t-dodecyl mercaptan, and 3.9 g of a 10% aqueous NaOH solution. Subsequently, another monomer emulsion was fed into the reactor over the course of 3 h, consisting of 92.6 g water, 10.4 g Sodium lauryl sulfate, 2.3 g methacrylic acid, 93.6 g t-butyl methacrylate, and 62.4 g CAM (castor oil acrylate monomer). Then the dispersion was post-stripped by adding the following two mixtures as two separate feeds over the course of 2 hours: (a) 1.1 g 70% tert-butyl hydroperoxide solution and 30.9 g water and (b) 0.5 g sodium metabisulfite, 0.3 g acetone, and 31.2 g water. The latex was then cooled to room temperature and filtered.

No. 6: A mixture of 596.6 g water and 47.1 g seed were charged into a reaction vessel, and the mixture was heated to 80° C. From an initiator feed of 28.5 g water and 1.5 g ammonium persulfate, 5% was removed and added to the reaction mixture. After 5 minutes, the remainder of the initiator feed was added to the reaction mixture over the course of 5 h. Simultaneously, a monomer emulsion feed stream was added over the course of 2 h, consisting of 315.1 g water, 40.0 g Sodium lauryl sulfate, 5.3 g methacrylic acid, 337.5 g butyl acrylate, 255.0 g methyl methacrylate, 1.5 g t-dodecyl mercaptan, and 3.8 g of a 10% aqueous NaOH solution. Subsequently, the reaction temperature was adjusted to 70° C. and another monomer emulsion was fed into the reactor over the course of 3 h, consisting of 84.8 g water, 15.0 g Sodium lauryl sulfate, 2.3 g methacrylic acid, 82.5 g t-butyl acrylate, 45.0 g butyl acrylate, and 22.5 g CAM (castor oil acrylate monomer). Then the dispersion was post-stripped by adding the following two mixtures as two separate feeds over the course of 2 hours: (a) 1.1 g 70% tert-butyl hydroperoxide solution and 29.7 g water and (b) 0.5 g sodium metabisulfite, 0.3 g acetone, and 30.0 g water. The latex was then cooled to room temperature and filtered.

No. 7: A mixture of 564.6 g water and 45.9 g seed were charged into a reaction vessel, and the mixture was heated to 85° C. From an initiator feed of 27.8 g water and 1.5 g ammonium persulfate, 5% was removed and added to the reaction mixture. After 5 minutes, the remainder of the initiator feed and a monomer emulsion mixture feed (consisting of 402.3 g water, 29.3 g Sodium lauryl sulfate, 9.8 g Sodium salt of fatty alcohol ether sulphate, 11.0 g acrylic acid, 453.7 g butyl acrylate, 142.7 g methyl methacrylate, 124.4 g AAEM (2-(acetoacetyl)ethyl methacrylate), and 1.5 g t-dodecyl mercaptan) were added over 3 hours in separate feeds. After cooling to 75° C. and an addition of 1.3 g of a 29% $NH_4OH$ solution, the dispersion was post-stripped by adding the following two mixtures as two separate feeds over the course of 2 hours: (a) 1.1 g 70% tert-butyl hydroperoxide solution and 29.0 g water and (b) 0.4 g sodium metabisulfite, 0.3 g acetone, and 29.3 g water. The latex was cooled to room temperature and filtered. Subsequently 20 ml of a 29% $NH_4OH$ solution was added. Over the course of two days, another 40 ml 29% $NH_4OH$ solution were added (2×20 ml).

No. 8: A mixture of 564.6 g water and 45.9 g seed were charged into a reaction vessel, and the mixture was heated to 70° C. From an initiator feed of 27.8 g water and 1.5 g ammonium persulfate, 5% was removed and added to the reaction mixture. After 5 minutes, the remainder of the initiator feed and a monomer emulsion mixture feed (consisting of 402.3 g water, 29.3 g Sodium lauryl sulfate, 9.8 g Sodium salt of fatty alcohol ether sulphate, 11.0 g acrylic acid, 373.2 g butyl acrylate, 168.3 g methyl methacrylate, 124.4 g AAEM (2-(acetoacetyl)ethyl methacrylate), 54.9 g CAM (castor oil acrylate monomer), and 1.5 g t-dodecyl mercaptan) were added over 3 hours in separate feeds. After adding 1.3 g of a 29% $NH_4OH$ solution, the dispersion was post-stripped by adding the following two mixtures as two separate feeds over the course of 2 hours: (a) 1.1 g 70% tert-butyl hydroperoxide solution and 29.0 g water and (b) 0.4 g sodium metabisulfite, 0.3 g acetone, and 29.3 g water. The latex was cooled to room temperature and filtered. Subsequently 20 ml of a 29% $NH_4OH$ solution was added. Over the course of two days, another 40 ml 29% $NH_4OH$ solution were added (2×20 ml).

No. 9: A mixture of 308.7 g water and 25.1 g seed were charged into a reaction vessel, and the mixture was heated to 70° C. From an initiator feed of 15.2 g water and 0.8 g ammonium persulfate, 5% was removed and added to the reaction mixture. After 5 minutes, the remainder of the initiator feed and a monomer emulsion mixture feed (consisting of 219.9 g water, 16.0 g Sodium lauryl sulfate, 5.3 g Sodium salt of fatty alcohol ether sulphate, 6.0 g acrylic acid, 208.0 g butyl acrylate, 66.0 g methyl methacrylate, 120.0 g AAEM (2-(acetoacetyl)ethyl methacrylate), and 0.8 g t-dodecyl mercaptan) were added over 3 hours in separate feeds. After adding 0.7 g of a 29% $NH_4OH$ solution, the dispersion was post-stripped by adding the following two mixtures as two separate feeds over the course of 2 hours: (a) 0.6 g 70% tert-butyl hydroperoxide solution and 15.8 g water and (b) 0.2 g sodium metabisulfite, 0.2 g acetone, and 16.0 g water. The latex was cooled to room temperature and filtered. Subsequently 10 ml of a 29% NH$_4$OH solution was added. Over the course of four days, another 40 ml 29% NH$_4$OH solution were added (4×10 ml).

No. 10: A mixture of 385.8 g water and 31.4 g seed were charged into a reaction vessel, and the mixture was heated to 85° C. From an initiator feed of 19.0 g water and 1.0 g ammonium persulfate, 5% was removed and added to the reaction mixture. After 5 minutes, the remainder of the initiator feed and a monomer emulsion mixture feed (consisting of 274.9 g water, 20.0 g Sodium lauryl sulfate, 6.7 g Sodium salt of fatty alcohol ether sulphate, 7.5 g acrylic acid, 360.0 g butyl acrylate, 87.5 g methyl methacrylate, 45.0 g AAEM (2-(acetoacetyl)ethyl methacrylate), and 1.0 g t-dodecyl mercaptan, were added over 3 hours in separate feeds. After adding 0.9 g of a 29% NH$_4$OH solution, the dispersion was post-stripped by adding the following two mixtures as two separate feeds over the course of 2 hours: (a) 0.7 g 70% tert-butyl hydroperoxide solution and 19.8 g water and (b) 0.3 g sodium metabisulfite, 0.2 g acetone, and 20.0 g water. The latex was cooled to room temperature and filtered. Subsequently 10 ml of a 29% NH$_4$OH solution was added.

No. 11: A mixture of 617.3 g water and 50.2 g seed were charged into a reaction vessel, and the mixture was heated to 50° C. From an initiator feed of 30.4 g water and 1.6 g ammonium persulfate, 5% was removed and added to the reaction mixture. After 5 minutes, the remainder of the initiator feed and a monomer emulsion mixture feed (consisting of 439.9 g water, 32.0 g Sodium lauryl sulfate, 10.7 g Sodium salt of fatty alcohol ether sulphate, 12.0 g acrylic acid, 472.0 g butyl acrylate, 120.0 g methyl methacrylate, 136.0 g AAEM (2-(acetoacetyl)ethyl methacrylate), 60.0 g CAM (castor oil acrylate monomer), and 1.6 g t-dodecyl mercaptan) were added over 3 hours in separate feeds. After adding 1.4 g of a 29% NH$_4$OH solution, the dispersion was post-stripped by adding the following two mixtures as two separate feeds over the course of 2 hours: (a) 1.1 g 70% tert-butyl hydroperoxide solution and 31.7 g water and (b) 0.5 g sodium metabisulfite, 0.3 g acetone, and 32.0 g water. The latex was cooled to room temperature and filtered. Subsequently 10 ml of a 29% NH$_4$OH solution was added. Over the course of three days, another 30 ml 29% NH$_4$OH solution were added (3×10 ml).

No. 12: A mixture of 674.9 g water and 53.3 g seed were charged into a reaction vessel, and the mixture was heated to 50° C. From an initiator feed of 32.3 g water and 1.7 g ammonium persulfate, 5% was removed and added to the reaction mixture. After 5 minutes, the remainder of the initiator feed and a monomer emulsion mixture feed (consisting of 458.0 g water, 56.7 g Sodium lauryl sulfate, 8.5 g methacrylic acid, 450.5 g butyl acrylate, 306.0 g methyl methacrylate, 85.0 g CAM (castor oil acrylate monomer), 1.7 g t-dodecyl mercaptan, and 4.3 g of a 10% NaOH solution) were added over 4 hours in separate feeds. The dispersion was post-stripped by adding the following two mixtures: (a) 1.2 g 70% tert-butyl hydroperoxide solution and 33.6 g water and (b) 0.5 g sodium metabisulfite, 0.3 g acetone, and 34.0 g water. The material was filtered and stored.

No. 13: A mixture of 516.1 g water and 40.8 g seed were charged into a reaction vessel, and the mixture was heated to 70° C. From an initiator feed of 24.7 g water and 1.3 g ammonium persulfate, 5% was removed and added to the reaction mixture. After 5 minutes, the remainder of the initiator feed and a monomer emulsion mixture feed (consisting of 350.2 g water, 43.3 g Sodium lauryl sulfate, 6.5 g methacrylic acid, 344.5 g butyl acrylate, 234.0 g methyl methacrylate, 65.0 g CAM (castor oil acrylate monomer), 1.3 g t-dodecyl mercaptan, and 3.3 g of a 10% NaOH solution) were added over 3 hours in separate feeds. The dispersion was post-stripped by adding the following two mixtures: (a) 0.9 g 70% tert-butyl hydroperoxide solution and 25.7 g water and (b) 0.4 g sodium metabisulfite, 0.3 g acetone, and 26.0 g water. The material was filtered and stored.

Film Studies

To study auto-oxidative crosslinking behavior, the model latexes No. 1–No. 9 prepared were treated with additives, and from these mixtures films were drawn. To facilitate autoxidation, a cobalt drier was added as a catalyst. In the films, both the AAEM and the CAM moieties were present to provide crosslinking. Therefore, either AAEM and CAM containing latexes were blended, or an AAEM-latex was mixed with the CAM monomer, or latex No. 8 was used with both functionalities present. The drier salt was a 6% cobalt octanoate solution in mineral spirits sold under the trade name NUXTRA™ from Huls America. The mixing of the drier salt into the composition was facilitated by the inclusion of other additives TEXANOL™ (coalescent), TRITON™ X-405 from Rohm and Haas (surfactant), and FOAMASTER™ VL from Cognis, Inc. (defoamer). In a first set of experiments, film forming experiments from U.S. Pat. No. 5,484,849, which is incorporated herein by reference, were used. The ratios and types of additives used were similar to those in U.S. Pat. No. 5,484,849. However, for the formulations used here, the compositions were modified because the procedures in U.S. Pat. No. 5,484,849 did not work with the compositions of the present invention in that the compositions formed two layers. When the thickener, NATRASOL™ 250 hydroxyethyl cellulose thickener from Aqualon (2% aq. solution), was omitted the problem subsided, and the mixture was homogenous. However, in most cases, a greenish precipitate formed, floating on top of the mixture, but nevertheless the mixture displayed a pink color. This problem was solved by adding TEXANOL™ ester alcohol solvent from Eastman in the mixture. In the examples below, the amount of TEXANOL™ solvent and/or glycol listed is the percentage amount by weight that the solvent was added to the composition.

Evidence for crosslinking can be found in films derived from formulations 33–37, below. Here various AAEM and CAM containing latexes have been blended, and from these formulations films were cast. Results from films 31–37 are shown below in Table 3. Tensile and water absorption data were tested on thick films (500 μm). The coalescents used in each example were: 33–37 4.5% TEXANOL™ solvent and 4.5% propylene glycol, and 31 and 32 9% TEXANOL™ solvent. MEK (methyl ethyl ketone) rub data was obtained from thin films (175 μm). The curing time for the thick films was 19 days at room temperature.

TABLE 3

| Film | Co[a] | Tensile data | | Water abs. data | | MEK |
| | | Ten. St.[b] | elong.[c] | WA[d] | sol.[e] | rubs[f] |
| --- | --- | --- | --- | --- | --- | --- |
| 31 - model[g] | no | 4.69 (68) | 1411 | — | — | — |
| 32 - model + AAEM(30)[g] | yes | 18.96 (275) | 448 | 12.23 | — | — |

TABLE 3-continued

| Film | Co[a] | Tensile data Ten. St.[b] | elong.[c] | Water abs. data WA[d] | sol.[e] | MEK rubs[f] |
|---|---|---|---|---|---|---|
| 33 - model + CAM[g] | yes | 28.2 (409) | 614 | 19.81 | 1.76 | 6 |
| 34 - A($T_g$20) + CAM[g] | yes | 48.57 (719) | 236 | 14.82 | 2.84 | 7 |
| 35 - A($T_g$20) + CAM (C-S)[g] | yes | 18.69 (271) | 386 | 18.68 | 1.07 | 10 |
| 36 - A($T_g$20) + CAM (C-S)[g] | no | 11.86 (172) | 778 | 16.90 | 0.88 | 8 |
| 37 - A($T_g$20) + CAM-mon.[h] | yes | 11.86 (172) | 455 | 15.16 | 0.90 | 70 |

[a]Nuxtra (cobalt drier) added to the film formulation (0.75% of a 6% solution of cobalt octanoate).
[b]Tensile strength ×10⁵ Pa (pounds per square inch (psi) equivalent),
[c]max. elongation (%),
[d]water absorption (%),
[e]solubility (%),
[f]number of strokes.
[g]Latex blends: "model" denotes a straight acrylic system with no CAM or AAEM (BA and MMA polymer) (Sample No. 1); "CAM" denotes a latex with this functionality; "CAM (C-S)" denotes a core-shell system (Sample No. 6); CAM stands for Sample No. 4; A($T_g$20) stands for an AAEM latex with $T_g$ of 20° C. (Sample No. 2); AAEM(30) is Sample No. 9 having 30 wt % AAEM; and
[h]AAEM latex and CAM monomer A comparison of 31, 32, 33, and 34 provided the following results. The CAM function on its own appeared to be capable of crosslinking, evidenced by comparisons of tensile strengths of 31 and 33. Data show convincing evidence for even a higher degree of crosslinking in 34, compared to 33 (based on tensile data and water absorption) in the thick films. Thus, the AAEM function reinforces the crosslinking. In fact, of all the films prepared here, Film 34 indicates the most crosslinking according to tensile strength, water absorption, and DMA data (provided below). Comparing 35 with the corresponding blank 36 also gives evidence for crosslinking, as can be seen from the tensile data. It was remarkable how data from thick films corresponded with data from the thin films (MEK rubs). Whereas data from 33–36 were very similar, with possibly a slight amount of crosslinking for 35, film 37 proved to be very strong. This stands in contrast to tensile data that showed a reduced amount of crosslinking here. The tensile data, however, corresponded very well with DMA data that show that films were getting stronger (higher modulus=more crosslinked) in the following order: 33<36<35<37<34 (no data for 32 and 31). Again, 34 proves to be crosslinked most, having the highest modulus, and also for 37 and 35, there was good evidence of crosslinking. A comparison of 34 and 35 tends to show that the "core-shell" CAM latex from Sample No. 6 did not perform as well as the one-stage latex from Sample No. 4 in these experiments. One possible reason might be that the Sample No. 6 was synthesized at a higher temperature than Sample No. 4 (70° C. vs. 50° C.) possibly causing premature crosslinking. The results from dymanic mechanical analysis (DMA) on the film samples is given in Table 4 below.

TABLE 4

| Film | Co[a] | Onset plateau | Tail off | Tan delta |
|---|---|---|---|---|
| 33 - model + CAM[d] | yes | 75° C.[b] | 115° C. | 20° C. |
| 34 - A($T_g$20) + CAM[d] | yes | 40° C. | >150° C. | 10° C. |
| 35 - A($T_g$20) + CAM (C-S)[d] | yes | 35° C. | >150° C. | 5° C. |
| 36 - A($T_g$20) + CAM (C-S)[d] | no | 50° C.[b] | 125° C.[c] | 5° C. |
| 37 - A($T_g$20) + CAM-mon.[e] | yes | 30° C. | >150° C. | 5° C. |

[a]NUXTRA ™ cobalt drier added to the film formulation (0.75% of a 6% solution of cobalt octanoate).
[b]There was no real plateau, since the modulus was constantly decreasing.
[c]Very difficult to determine because there was a constant slope.
[d]Latex blends: "model" denotes a straight acrylics system (BA, MMA), Sample No. 1; "CAM" denotes a latex with this functionality; "CAM (C-S)" denotes a core-shell system, Sample No. 6, CAM stands for Sample No. 4; A($T_g$20) stands for an AAEM latex with $T_g$ of 20° C., Sample No. 2.
[e]AAEM latex and CAM monomer.

Additional films were prepared as described above and formulated as shown in Table 5 below. Results for films 41–54 are shown in Table 5 below. Tensile and water absorption data were received from thick films, and MEK rub data from thin films (coalescents used: 41–48 4.5% TEXANOL™ solvent and 4.5% propylene glycol, 49 9% TEXANOL™ solvent, 50–54 4.5% TEXANOL™ solvent). Curing time was 19 days at room temperature.

TABLE 5

| Film | Co[a] | Tensile data Ten. St.[b] | elong.[c] | Water abs. data WA[d] | sol.[e] | MEK rubs[f] |
|---|---|---|---|---|---|---|
| 41 - A($T_g$-2) + CAM(C-S)[g] | yes | 8.13 (118) | 411 | 13.22 | 1.57 | no data |
| 42 - A($T_g$-2) + CAM(C-S)[g] | no | 8.20 (119) | 531 | 13.87 | 1.31 | no data |
| 44 - AAEM/CAM[h] | yes | 7.58 (110) | 487 | 27.13 | 2.53 | no data |
| 45 - AAEM/CAM[h] | no | 9.86 (143) | 469 | 19.61 | 2.72 | no data |
| 46 - model + CAM(C-S)[g] | yes[j] | 8.93 (130) | 823 | 15.72 | 1.58 | no data |
| 47 - A($T_g$-2) + CAM(C-S)[g] | yes[j] | 8.13 (118) | 689 | 11.95 | 1.55 | no data |
| 48 - AAEM/CAM[h] | yes[j] | 8.82 (128) | 645 | 18.59 | 2.25 | no data |
| 49 - model + CAM[g] | yes | 17.71 (257) | 585 | 14.82 | 1.70 | 10–4 |
| 50 - A($T_g$-2) + CAM[g] | yes | 26.75 (388) | 584 | 13.29 | 1.22 | 11–8 |
| 51 - A($T_g$-2) + CAM[g] | no | 20.68 (300) | 674 | 12.03 | 1.45 | 11–7 |
| 52 - 3 A($T_g$-2) + 1 CAM[g] | yes | 17.44 (253) | 387 | 11.37 | 1.32 | 11–8 |
| 53 - 1 A($T_g$-2) + 3 CAM[g] | yes | 39.09 (567) | 374 | 20.14 | 1.37 | 11–7 |
| 54 - A($T_g$20) + CAM-mon.[i] | yes | 25.71 (373) | 465 | 13.73 | 0.76 | 12–9 |

[a]NUXTRA ™ cobalt drier added to the film formulation (0.75% of a 6% solution of cobalt octanoate).
[b]Tensile strength ×10⁵ Pa (pounds per square inch (psi) equivalent),
[c]max. elongation (%),
[d]water absorption (%),
[e]solubility (%),
[f]Number of strokes. First value: after 7 days drying time, second value after 25 days.
[g]Latex blends: "model" denotes a straight acrylics system (BA, MMA), Sample No. 1; "CAM" denotes a latex with this functionality; "CAM (C-S)" denotes a core-shell system, Sample No. 6, CAM stands for Sample No. 4; A($T_g$20) and A($T_g$-2) stand for AAEM latexes with the indicated $T_g$ values, respectively (Sample No. 2 and Sample No. 7). Ratio of blends was 1:1, except for 52 and 53.
[h]Latex Sample No. 8.
[i]AAEM latex and CAM monomer.
[j]here, only 0.08 wt % drier was added (usually 0.75%).

In samples 41–48, there was less evidence of crosslinking. Therefore, the "core-shell" CAM latex (Sample No. 6), as well as the combined AAEM/CAM latex (Sample No. 8) do not show as much crosslinking as the CAM latex Sample No. 4. The latter one was the only CAM system synthesized at 50° C., which might be a result of less premature crosslinking. Reviewing films 49–54, clear evidence for crosslinking can be found. In particular, comparing 49 through 51, 50 was the strongest film, the other two being blanks. Exceptionally strong was 53, with a ratio of AAEM latex versus CAM latex 1:3. Also 54, where CAM monomer was added to the AAEM latex shows crosslinking. DMA data strongly supports this evidence, which is given in Table 6 below. Of samples 49–54, 49 exhibited the lowest modulus, and 51 the second lowest. Both samples were blanks, either without AAEM or without the drier. Moduli of 50, 52, 53 and 54 were significantly higher.

TABLE 6

| Film | Co[a] | Onset plateau | Tail off | Tan delta |
|---|---|---|---|---|
| 49 - model + CAM[d] | yes | 50° C.[b] | 100° C. | ?[c] |
| 50 - A($T_g$-2) + CAM[d] | yes | 40° C. | >145° C. | 25° C. |
| 51 - A($T_g$-2) + CAM[d] | no | 60° C. | 110° C. | 30° C. |
| 52 - 3 A($T_g$-2) + 1 CAM[d] | yes | 45° C. | >150° C. | 30° C. |
| 53 - 1 A($T_g$-2) + 3 CAM[d] | yes | 50° C. | 130° C. | 30° C. |
| 54 - A($T_g$20) + CAM-mon.[e] | yes | 40° C. | 130° C. | 15° C. |

[a]NUXTRA ™ cobalt drier added to the film formulation (0.75% of a 6% solution of cobalt octanoate).
[b]There was no real plateau; instead the modulus was constantly decreasing.
[c]Data did not show any maximum.
[d]Latex blends: "model" denotes a straight acrylics system (BA, MMA), Sample No. 1; "CAM" denotes a latex with this functionality, Sample No. 4; A($T_g$20) and A($T_g$ -2) stand for AAEM latexes with the indicated $T_g$ values, respectively (Sample No. 2 and Sample No. 7). Ratio of blends was 1:1, except for 52 and 53.
[e]AAEM latex and CAM monomer.

Additional films 63–69 were prepared as above and formulated as shown in Table 7 below. In examples 63–69, again crosslinking can be shown. The blanks 63 and 64 gave the highest elongation data points by far. Using a latex with higher AAEM content gave better results than using one with a lower content, for example comparing the 30 wt % AAEM latex versus the 17 wt % AAEM latex. Film 69 produced a reduced tensile strength and low elasticity data. As shown above, at least in part, water absorption and MEK rub data do not necessarily correspond. Results for films 63–69 are shown below in Table 7. Curing time for thick films was 19 days at room temperature.

TABLE 7

| | | Tensile data | | | | |
|---|---|---|---|---|---|---|
| | | Ten. | | Water abs. | | MEK |
| Film | Co[a] | St.[b] | elong.[c] | WA[d] | sol.[e] | rubs[f] |
| 63 - model + CAM[g] | yes | 12.76 (185) | 777 | 14.77 | 1.34 | 8 (4)–4 (3) |
| 64 - S504 + CAM[g] | yes | 23.79 (345) | 913 | 21.24 | 1.80 | 25 (9)–5 (4) |
| 65 - A($T_g$ 20)(17) + CAM[g] | yes | 21.30 (309) | 409 | 14.74 | 1.48 | 10 (7)–3 (4) |
| 66 - A($T_g$ -2)(17) + CAM[g] | yes | 20.48 (297) | 366 | 11.12 | 2.28 | 11 (7)–3 (4) |

TABLE 7-continued

| | | Tensile data | | | | |
|---|---|---|---|---|---|---|
| | | Ten. | | Water abs. | | MEK |
| Film | Co[a] | St.[b] | elong.[c] | WA[d] | sol.[e] | rubs[f] |
| 67 - AAEM(30) + CAM[g] | yes | 26.27 (381) | 341 | 16.38 | 2.03 | 10 (8)–4 (4) |
| 68 - AAEM(30) + CAM[g] | no | 24.68 (358) | 451 | 16.02 | 1.92 | 14 (7)–3 (3) |
| 69 - AAEM(30) + CAM mon.[h] | yes | 10.48 (152) | 223 | 12.57 | 1.78 | 6 (5)–6 (6) |

[a]NUXTRA ™ cobalt drier added to the film formulation (0.75% of a 6% solution of cobalt octanoate).
[b]Tensile strength ×10⁵ Pa (pounds per square inch (psi) equivalent),
[c]max. elongation (%),
[d]water absorption (%),
[e]solubility (%),
[f]Number of strokes. First value: after 7 days at room temperature (31 days at room temperature), second value after 7 days at 60° C. (14 days at 60° C.).
[g]Latex blends: "model" denotes a straight acrylics system (BA, MMA), Sample No. 1; "AAEM" and "CAM" denote latexes with these functionalities. A($T_g$ 20 or -2)(17) contains 17 wt % functional group, Sample No. 2 and Sample No. 7, AAEM(30) 30% ($T_g$ -7), Sample No. 9. S504 was ACRONAL ® S504 dispersion from BASF Corporation.
[h]AAEM latex and CAM monomer. From DMA data given in Table 8 below, the strongest cases for crosslinking among the examples were films 67 and 69. Comparing 67 and 68, 68 gave showed less crosslinking (lower modulus).

TABLE 8

| Film | Co[a] | Onset plateau | Tail off | Tan delta |
|---|---|---|---|---|
| 64 - S504 + CAM[c] | yes | 50–70° C.[b] | 125° C. | 20° C. |
| 66 - A($T_g$-2)(17) + CAM[c] | yes | 50° C. | >150° C. | 20° C. |
| 67 - AAEM(30) + CAM[c] | yes | 40° C. | >150° C. | 15° C. |
| 68 - AAEM(30) + CAM[c] | no | 50° C. | 125° C. | 30° C. |
| 69 - AAEM(30) + CAM mon.[d] | yes | 25° C. | >150° C. | 0° C. |

[a]NUXTRA ™ cobalt drier added to the film formulation (0.75% of a 6% solution of cobalt octanoate).
[b]There are no real plateau; instead the modulus was constantly decreasing.
[c]Latex blends: "AAEM" (or "A") and "CAM" denote latexes with these functionalities. A($T_g$ - 2)(17) contains 17 wt % functional group, Sample No. 7, AAEM(30) 30% ($T_g$ - 7), Sample No. 9. S504 was ACRONAL ® S504 dispersion.
[d]AAEM latex and CAM monomer.

Additional films 73–78 and 84 were prepared as above and formulated as shown in Table 9 below. Film 77 was the same as film 2. Of films 73–76, 76 displayed the highest tensile strength. The model/AAEM blend in film 77 gave a low tensile strength, CAM derived film 78 gave a very high tensile strength and also a very high elasticity (666% max. elongation). Also, here the water absorption was very low, indicating crosslinking. Films 77 and 78 showed that CAM seemed to be able to induce and reinforce crosslinking, whereas AAEM only reinforces when in combination with CAM. Based on the economic cost of CAM and AAEM, it is desired to substitute as much CAM for AAEM as possible. Results for films 73–78 and 84 are shown below in Table 9. Drying time was 31 days at room temperature.

TABLE 9

| Film | Co[a] | Tensile data Ten. St.[b] | ME[c] | Water abs. WA[d] | Sol.[e] | MEK rubs[f] |
|---|---|---|---|---|---|---|
| 73 - AAEM(30) + CAM[g] | no | 24.34 (353) | 507 | 11.67 | 1.50 | 25 |
| 74 - AAEM(30) + CAM[g] | yes | 25.03 (363) | 272 | 19.12 | 1.95 | 27 |
| 75 - 1 AAEM(30) + 2 CAM[g] | yes | 23.37 (339) | 338 | 15.16 | 1.61 | 26 |
| 76 - 2 AAEM(30) + 1 CAM[g] | yes | 27.23 (395) | 278 | 10.62 | 1.18 | 38 |
| 77 - model + AAEM(30)[g] | yes | 18.96 (275) | 448 | 12.23 | 0.61 | 42 |
| 78 - CAM[g] | yes | 47.16 (684) | 666 | 9.14 | 1.08 | 23 |
| 84 - CAM[g] | no | 39.92 (579) | 700 | — | — | — |

[a]NUXTRA cobalt drier added to the film formulation (0.75% of a 6% solution of cobalt octanoate).
[b]Tensile strength ×10$^5$ Pa (Pounds per square inch (psi) equivalent),
[c]max. elongation (%),
[d]water absorption (%),
[e]solubility (%),
[f]number of strokes. Films were dried for 17 days at room temperature.
[g]Latex blends: "model" denotes a straight acrylics system (BA, MMA), Sample No. 1; "AAEM" and "CAM" denote latexes with these functionalities. AAEM(30) contains 30% ($T_g$ −7) AAEM, Sample No. 9. CAM was Sample No. 4.

Additional films 91 and 92 were prepared as described above and formulated as shown in Table 10 below. As observed for the majority of thin films, MEK rubs provided reduced support for crosslinking. This was only true, however, for films dried on air (ambient conditions). Films 91 and 92 showed that when dried in a humidity chamber (100% humidity), there was a significant difference in film strength for a sample that contained the drier (Film 91) compared to one that did not contain it (Film 92). Without being limited by theory, under humid conditions, films would be allowed to dry slower, which may cause efficient polymer diffusion between particles in the process of film formation. This result strongly shows crosslinking during film formation. The results for films 91 and 92 are shown in Table 10 below. The condition in the humidity chamber corresponded to 100% humidity. The drying time was 33 days at room temperature.

TABLE 10

| Film | Co[a] | drying cond. | MEK rubs[b] |
|---|---|---|---|
| 91 - A($T_g$−2)(17) + CAM-mon.[c] | yes | humidity cham. | 80 |
| 92 - A($T_g$−2)(17) + CAM-mon.[c] | no | humidity cham. | 7 |
| 91 - A($T_g$−2)(17) + CAM-mon.[c] | yes | ambient | 41 |
| 92 - A($T_g$−2)(17) + CAM-mon.[c] | no | ambient | 39 |

[a]NUXTRA cobalt drier added to the film formulation (0.75% of a 6% solution of cobalt octanoate).
[b]Number of double strokes (½ pound hammer).
[c]Latex Sample No. 7 (17% AAEM, $T_g$ −2° C.) mixed with CAM monomer (1.25 wt %).

Additional films 93–98 were prepared as described above and formulated as described in Table 11 below. The following set of data showed how film strength decreases with less drier used and also with less AAEM used. AAEM alone results in low tensile strength (Films 97 and 98). Data for films 93–97 are shown below in Table 11. Drying time was 19 days at room temperature.

TABLE 11

| Film | Nuxtra (%)[a] | Tensile data Ten. St.[b] | ME[c] | Water abs. WA[d] | Sol.[e] |
|---|---|---|---|---|---|
| 93 - AAEM(9) + CAM[f] | 0.75 | 17.65 (256) | 369 | 13.39 | 2.82 |
| 94 - AAEM(9) + CAM[f] | 0.37 | 12.27 (178) | 436 | 14.15 | 3.55 |
| 95 - AAEM(9) + CAM[f] | — | 11.58 (168) | 433 | 12.59 | 3.96 |
| 96 - AAEM(30) + CAM[f] | 0.37 | 15.72 (228) | 415 | 17.35 | 2.90 |
| 97 - AAEM(9)[f] | 0.75 | 6.07 (88) | 316 | 12.29 | 2.78 |
| 98 - AAEM(9)[f] | — | 5.45 (79) | 412 | — | — |

[a]NUXTRA ™ 6% solution of cobalt octanoate. 0.75% was regular amount of drier for all experiments described.
[b]Tensile strength ×10$^5$ Pa (Pounds per square inch (psi) equivalent),
[c]max. elongation (%),
[d]water absorption (%),
[e]solubility (%).
[f]Latex blends: "AAEM" and "CAM" (Sample No. 4) denote latexes with these functionalities. AAEM(30) contains 30% ($T_g$ −7) AAEM, Sample No. 9, and AAEM(9) contains 9% ($T_g$ −14), Sample No. 10.

Additional films were prepared as described above and formulated as described in Table 12 below. Film samples 120 and 124–127 were prepared without CAM. Films 124–127 show the influence of the $T_g$ on tensile strength. Drying time was 19 days at room temperature.

TABLE 12

| Film | Co[a] | Tensile data Ten. St.[b] | ME[c] | Water abs. WA[d] | Sol.[e] |
|---|---|---|---|---|---|
| 120 - AAEM(30)[f] | yes | 13.93 (202) | 416 | 13.42 | 2.15 |
| 124 - AAEM(17, $T_g$20)[f] | yes | 18.82 (273) | 461 | 11.83 | 1.40 |
| 125 - AAEM(17, $T_g$20)[f] | no | 10.62 (154) | 744 | 13.01 | 1.06 |
| 126 - AAEM(17, $T_g$−2)[f] | yes | 8.07 (117) | 336 | 8.26 | 2.06 |
| 127 - AAEM(17, $T_g$−2)[f] | no | 4.0 (58) | 757 | 10.47 | 2.58 |

[a]NUXTRA ™ a 6% solution of cobalt octanoate, 0.75% was used where indicated.
[b]Tensile strength ×10$^5$ Pa (pounds per square inch (psi) equivalent),
[c]max. elongation (%),
[d]water absorption (%),
[e]solubility (%).
[f]AAEM(17, $T_g$ 20) containing 17% AAEM was latex Sample No. 2; AAEM(17, $T_g$ −2) also containing 17% AAEM was sample No. 7; AAEM (30) contains 30% AAEM ($T_g$ −7), Sample No. 9.

Additional films 128–135 were prepared as described above and formulated as shown in Table 13 below. From formulations 128–135 thin films were drawn and tested via MEK rubs. As shown above (Films 91 and 92), there was a difference in result from films dried on air (ambient conditions) as compared to those from films dried in a humidity chamber. Crosslinking was most pronounced in films 128/129, 130/131 and 132/133, that were not reproduced in the air-dried films. Film 130, based on CAM alone, was more resistant against MEK than Film 128, based on AAEM and CAM. Results from MEK rubs on thin films (9% TEXANOL™ solvent was used in the film formulations) are shown in Table 13 below. The condition in the humidity chamber corresponds to 100% humidity. The drying time was 26 days at room temperature.

TABLE 13

| Film | Co[a] | drying cond. | MEK rubs[b] |
|---|---|---|---|
| 128 - A($T_g$-2)(17) + CAM[c] | yes | humidity cham. | 36 |
| 129 - A($T_g$-2)(17) + CAM[c] | no | humidity cham. | 10 |
| 130 - CAM[d] | yes | humidity cham. | 120 |
| 131 - CAM[d] | no | humidity cham. | 15 |
| 132 - A($T_g$-2)(17)[e] | yes | humidity cham. | 100 |
| 133 - A($T_g$-2)(17)[e] | no | humidity cham. | 65 |
| 134 - AAEM/CAM[f] | yes | humidity cham. | 6 |
| 135 - AAEM/CAM[f] | no | humidity cham. | 5 |
| 128 - A($T_g$-2)(17) + CAM[c] | yes | ambient | 16 |
| 129 - A($T_g$-2)(17) + CAM[c] | no | ambient | 19 |
| 130 - CAM[d] | yes | ambient | 11 |
| 131 - CAM[d] | no | ambient | 21 |
| 132 - A($T_g$-2)(17)[e] | yes | ambient | 21 |
| 133 - A($T_g$-2)(17)[e] | no | ambient | 15 |
| 134 - AAEM/CAM[f] | yes | ambient | 18 |
| 135 - AAEM/CAM[f] | no | ambient | 39 |

[a]NUXTRA™ cobalt drier added to the film formulation (0.75% of a 6% solution of cobalt octanoate).
[b]Number of strokes (½ pound hammer).
[c]Latex Sample No. 7 (17% AAEM, $T_g$ -2° C.) and Sample No. 4 (CAM),
[d]Sample No. 4 (CAM latex),
[e]Sample No. 7 (17% AAEM, $T_g$ -2° C.),
[f]combined AAEM/CAM latex Sample No. 11 ($T_g$ -33° C.)

Additional films 136–141 were prepared as described above and formulated as shown in Table 14 below. The following data suggests that the combined AAEM/CAM latex Sample No. 11 does not provide as much crosslinking when dried on air with the cobalt drier as does the other samples. The low tensile strength of 136 suggests a lower amount crosslinking. Similar results were achieved with Sample No. 8. Sample No. 11 was synthesized at 50° C., and according to proton NMR spectroscopy, it contained impurities. Films 139–141 show that there was less crosslinking when bis-acrylate (1,4-butanediol-bisacrylate) or CAM monomer was added to AAEM latex Sample No. 10. This was in contradiction to results described earlier from thin films dried in a humidity chamber. The results for films 136–141 are shown in Table 14 below. Drying time was 21 days at room temperature. In Table 14 below, AAEM/CAM ($T_g$-33)=Sample No. 11 and AAEM (9, $T_g$-14)=Sample No. 10.

TABLE 14

| | | tensile data | |
|---|---|---|---|
| Film | Co[a] | Tensile strength × $10^5$ Pa (psi) | max. elong. (%) |
| 136 - AAEM/CAM ($T_g$-33) | yes | 3.86 (56) | 139 |
| 139 - AAEM (9, $T_g$-14) | no | 5.72 (83) | 555 |
| 140 - AAEM (9, $T_g$-14) + bis-acr.[a] | yes | 5.17 (75) | 73 |
| 141 - AAEM (9, $T_g$-14) + CAM[b] | yes | 5.17 (75) | 74 |

[a]bis-acrylate (1,4-butanediol-bisacrylate),
[b]CAM monomer.

Summary of CAM/AAEM crosslinking studies: Evidence for crosslinking in films derived from formulations with combined AAEM (acetoacetoxyethylmethacrylate) and CAM (castor oil acrylate monomer) functions was obtained, particularly through tensile test data and DMA analysis. Effects were already well pronounced after 3 weeks drying time at room temperature. It was shown that blends of latexes that contain AAEM and CAM functions, respectively, work best. Also, an AAEM latex can be mixed with CAM monomer to give crosslinking, and additionally the combined AAEM/CAM latex Sample No. 8 gave positive results.

AAEM/CAM Crosslinking through UV Cure

As an alternative to air oxidation, curing with actinic radiation was tested. In these examples, the actinic radiation was UV radiation, which ranged from 200–500 nm. To facilitate UV curing, samples were prepared containing a UV curing agent, benzophenone. UV cured films proved to be much stronger than the blank samples that were not UV cured. When comparing films 82 and 83, it can be seen that without the UV curing agent, results were even better. Without being limited to theory, it is theorized that the enamine adjunct of AAEM acts as a photosensitizer itself; whereas, benzophenone might quench photoprocesses or cause bond-breaking. A minor UV crosslinking effect can be seen with CAM alone (84) or even with the model system (86). The temperature in the UV chamber was measured to be 50° C., therefore blank tests were conducted with samples being cured at that temperature. From these blanks it can be stated that the crosslinking in the UV-cured films was due mainly to the UV light, and to a lesser degree, to heat. In films 84 and 86, heat curing gave exceptionally high tensile strengths. Note, the temperature in the UV chamber was not a constant 50° C. It varied ±5° C.

For comparison purposes with the auto-oxidation films, some of the formulations in the UV curing examples contained TEXANOL™ solvent. Those samples that contained TEXANOL™ solvent will be indicated below.

Compositions were prepared as described below in Table 15 and films 81–86 were prepared with a thickness of 500 μm. Drying time was initially 11 days without UV curing at room temperature, and then 7 days with UV irradiation from a xenon lamp. For respective room temperature blanks, drying time was 18 days, and for heat-cured blanks the drying time was 18 days at room temperature and 7 days at 50° C.). TEXANOL™ solvent was added to the compositions at 9% by weight. The results are shown in Table 15 below.

TABLE 15

| | | | tensile data | |
|---|---|---|---|---|
| Film | sens.[a] | cure | Tensile strength × $10^5$ Pa (psi) | max. elong. (%) |
| 81 - AAEM(30) + CAM[b] | yes | rt | 25.23 (366) | 443 |
| 81 - AAEM(30) + CAM[b] | yes | UV | 87.49 (1269) | 122 |
| 81 - AAEM(30) + CAM[b] | yes | heat | 46.47 (674) | 452 |
| 82 - A($T_g$-2)(17) + CAM[b] | yes | rt | 16.75 (243) | 518 |
| 82 - A($T_g$-2)(17) + CAM[b] | yes | UV | 54.53 (791) | 158 |
| 82 - A($T_g$-2)(17) + CAM[b] | yes | heat | 32.61 (473) | 491 |
| 83 - A($T_g$-2)(17) + CAM[b] | no | rt | 16.27 (236) | 419 |
| 83 - A($T_g$-2)(17) + CAM[b] | no | UV | 85.15 (1235) | 198 |
| 83 - A($T_g$-2)(17) + CAM[b] | no | heat | 32.2 (467) | 491 |

TABLE 15-continued

| Film | sens.[a] | cure | Tensile strength × 10⁵ Pa (psi) | max. elong. (%) |
|---|---|---|---|---|
| 84 - CAM[b] | yes | rt | 39.92 (579) | 700 |
| 84 - CAM[b] | yes | UV | 56.4 (818) | 314 |
| 84 - CAM[b] | yes | heat | 53.92 (782) | 412 |
| 86 - model[b] | yes | rt | 4.69 (68) | 1411 |
| 86 - model[b] | yes | UV | 16.82 (244) | 526 |
| 86 - model[b] | yes | heat | 33.30 (483) | 557 |

[a]UV-sensitizer: 0.3 wt % PHOTOMER ™ 81 (from Cognis) was used (mixture of benzophenone and 4-methylbenzophenone).
[b]Latex blends: "model" denotes a straight acrylics system (BA, MMA), Sample No. 1; "AAEM" and "CAM" (Sample No.4) denote latexes with these functionalities. AAEM(30) contains 30% ($T_g$ -7) AAEM, Sample No. 9, and A($T_g$ -2)(17) contains 17%, Sample No. 7.

Additional films 102–106 were prepared as described above and formulated as described in Table 16 below. For UV-cured samples, drying time was initially 11 days at room temperature without UV, and then 3 days with UV irradiation. For respective room temperature blanks, the drying time was 14 days. For heat-cured blanks, drying time was 11 days at room temperature and 3 days at 50° C. TEXANOL™ solvent was added at 4.5% by weight to the formulations. Results are shown in Table 16 below.

UV cured samples 102 and 103 displayed much higher tensile strengths compared to room temperature or heat cured samples. Blank film 105 gave weak films; whereas, room temperature and heat cured film 106 was strong, which theoretically may be due to the high $T_g$ (28° C.). As described before, the UV sensitizer does not really make a difference, as can be seen from comparison of films 102 and 103.

TABLE 16

| Film | sens.[a] | cure | Tensile strength × 10⁵ Pa (psi) | max. elong. (%) |
|---|---|---|---|---|
| 102 - AAEM(9) + CAM[b] | yes | rt | 18.13 (263) | 574 |
| 102 - AAEM(9) + CAM[b] | yes | heat | 36.40 (528) | 752 |
| 102 - AAEM(9) + CAM[b] | yes | UV | 77.98 (1131) | 264 |
| 103 - AAEM(9) + CAM[b] | no | rt | 15.93 (231) | 572 |
| 103 - AAEM(9) + CAM[b] | no | heat | 34.61 (502) | 694 |
| 103 - AAEM(9) + CAM[b] | no | UV | 66.4 (963) | 257 |
| 105 - A($T_g$-2)(17)[b] | no | rt | 4.76 (69) | 328 |
| 105 - A($T_g$-2)(17)[b] | no | heat | 6.62 (96) | 536 |
| 105 - A($T_g$-2)(17)[b] | no | UV | 23.24 (337) | 114 |
| 106 - CAM[b] | no | rt | 32.61 (473) | 559 |
| 106 - CAM[b] | no | heat | 52.95 (768) | 460 |
| 106 - CAM[b] | no | UV | 42.26 (613) | 462 |

[a]UV-sensitive: 0.3 wt % PHOTOMER ™ 81 (Cognis) was used (mixture of benzophenone and 4-methylbenzophenone).
[b]Latex blends: "AAEM" and "CAM" Sample No. 4) denote latexes with these functionalities. AAEM(9) contains 9% ($T_g$ 14) AAEM, Sample No. 10, and A($T_g$ -2)(17) contains 17%, Sample No. 7.

Additional films 109–116 were prepared as described above and formulated as described in Table 17 below. For UV-cured samples, drying time was initially 11 days at room temperature without UV, and then 3 days with UV irradiation. For respective room temperature blanks, drying time was 14 days. For heat-cured blanks, drying time was 11 days at room temperature and 3 days at 50° C. No TEXANOL™ solvent was used in the formulations. Results are shown in Table 17 below.

As films 109 and 110 show, UV cure did not have any effect on the model system containing only BA and MMA. AAEM alone cures by means of UV irradiation (films 111 and 112), with the more concentrated system being more efficient (111 and 112, versus 113 and 114). Results of 115 and 116 basically reproduce those of 102 and 103. Results were very similar, even though in 102 and 103 were compounded with TEXANOL™ solvent, whereas 115 and 116 were not.

TABLE 17

| Film | sens.[a] | cure | Tensile strength × 10⁵ Pa (psi) | max. elong. (%) |
|---|---|---|---|---|
| 109 - BA, MMA latex[b] | yes | rt | 30.47 (442) | 716 |
| 109 - BA, MMA latex[b] | yes | heat | 35.51 (515) | 598 |
| 109 - BA, MMA latex[b] | yes | UV | 35.65 (517) | 554 |
| 110 - BA, MMA latex[b] | no | rt | 21.24 (308) | 843 |
| 110 - BA, MMA latex[b] | no | heat | 25.79 (374) | 636 |
| 110 - BA, MMA latex[b] | no | UV | 18.89 (274) | 537 |
| 111 - AAEM(30)[c] | yes | rt | 13.58 (197) | 543 |
| 111 - AAEM(30)[c] | yes | heat | 21.79 (316) | 395 |
| 111 - AAEM(30)[c] | yes | UV | 48.06 (697) | 51 |
| 112 - AAEM(30)[c] | no | rt | 15.72 (228) | 576 |
| 112 - AAEM(30)[c] | no | heat | 25.44 (369) | 425 |
| 112 - AAEM(30)[c] | no | UV | 43.71 (634) | 42 |
| 113 - AAEM(9)[d] | yes | rt | 8.0 (116) | 611 |
| 113 - AAEM(9)[d] | yes | heat | 6.27 (91) | 370 |

TABLE 17-continued

| Film | sens.[a] | cure | Tensile strength × 10⁵ Pa (psi) | max. elong. (%) |
|---|---|---|---|---|
| 113 - AAEM(9)[d] | yes | UV | 11.79 (171) | 139 |
| 114 - AAEM(9)[d] | no | rt | 7.38 (107) | 486 |
| 114 - AAEM(9)[d] | no | heat | 6.48 (94) | 452 |
| 114 - AAEM(9)[d] | no | UV | 9.72 (141) | 123 |
| 115 - CAM + AAEM(9)[e] | yes | rt | 20.68 (300) | 677 |
| 115 - CAM + AAEM(9)[e] | yes | heat | 40.47 (587) | 622 |
| 115 - CAM + AAEM(9)[e] | yes | UV | 70.53 (1023) | 236 |
| 116 - CAM + AAEM(9)[e] | no | rt | 21.03 (305) | 839 |
| 116 - CAM + AAEM(9)[e] | no | heat | 36.54 (530) | 616 |
| 116 - CAM + AAEM(9)[e] | no | UV | 71.22 (1033) | 249 |

[a]UV-sensitive: 0.3 wt % PHOTOMER™ 81 (Cognis) was used (mixture of benzophenone and 4-methylbenzophenone).
[b]model latex Sample No. 1,
[c]AAEM latex Sample No. 9, $T_g$ −7° C., 30 wt % AAEM,
[d]AAEM latex Sample No. 10, $T_g$ −14° C., 9 wt % AAEM,
[e]1:1 blend of latexes Sample No. 4 (CAM) and Sample No. 10 (AAEM).

Additional films 142–149 were prepared as described above and formulated as described in Table 18 below. To some samples as indicated, CAM monomer (CAM) or 1,4-butane-bisacrylate (BA) was added. TEXANOL™ solvent was added to the formulations at 4.5% by weight. Drying time was initially 13 days at room temperature, then 3 days in UV light (UV cure) or oven at 50° C. (heat cure). Results are shown in Table 18 below.

Films 142 and 143 indicated that crosslinking in the combined AAEM/CAM latex occurred when UV cure was provided. Films 144–149 showed a reduced effect on crosslinking upon addition of CAM monomer or bisacrylate. Data from AAEM latex blanks, without any additive, showed similar results.

TABLE 18

| Film | sens.[a] | cure | CAM | BA[b] | Ten. St.[c] | ME[d] |
|---|---|---|---|---|---|---|
| 142 - AAEM/CAM[e] | yes | rt | — | — | 6.21 (90) | 468 |
| 142 - AAEM/CAM[e] | yes | heat | — | — | 12.89 (187) | 419 |
| 142 - AAEM/CAM[e] | yes | UV | — | — | 45.71 (663) | 116 |
| 143 - AAEM/CAM[e] | — | rt | — | — | 5.79 (84) | 697 |
| 143 - AAEM/CAM[e] | — | heat | — | — | 10.27 (149) | 495 |
| 143 - AAEM/CAM[e] | — | UV | — | — | 39.16 (568) | 120 |
| 144 - AAEM(17)[f] | yes | rt | — | — | 3.51 (51) | 772 |
| 144 - AAEM(17)[f] | yes | heat | — | — | 6.76 (98) | 827 |
| 144 - AAEM(17)[f] | yes | UV | — | — | 24.54 (356) | 128 |
| 145 - AAEM(17)[f] | — | rt | — | — | 3.72 (54) | 716 |
| 145 - AAEM(17)[f] | — | heat | — | — | 4.21 (61) | 611 |
| 145 - AAEM(17)[f] | — | UV | — | — | 26.54 (385) | 119 |
| 146 - AAEM(17)[f] | yes | rt | yes | — | 4.21 (61) | 603 |
| 146 - AAEM(17)[f] | yes | heat | yes | — | 5.86 (85) | 585 |
| 146 - AAEM(17)[f] | yes | UV | yes | — | 21.03 (305) | 142 |
| 147 - AAEM(17)[f] | — | rt | yes | — | 4.07 (59) | 693 |
| 147 - AAEM(17)[f] | — | heat | yes | — | 5.03 (73) | 758 |
| 147 - AAEM(17)[f] | — | UV | yes | — | 24.54 (356) | 115 |
| 148 - AAEM(17)[f] | yes | rt | — | yes | 3.17 (46) | 688 |
| 148 - AAEM(17)[f] | yes | heat | — | yes | 4.48 (65) | 611 |
| 148 - AAEM(17)[f] | yes | UV | — | yes | 22.55 (327) | 119 |
| 149 - AAEM(17)[f] | — | rt | — | yes | 3.79 (55) | 733 |
| 149 - AAEM(17)[f] | — | heat | — | yes | 4.75 (69) | 519 |
| 149 - AAEM(17)[f] | — | UV | — | yes | 22.48 (326) | 128 |

[a]UV-sensitizer: 0.3 wt % PHOTOMER™ 81 was used (mixture of benzophenone and 4-methylbenzophenone).
[b]1,4-butanediol-bisacrylate,
[c]Tensile strength ×10⁵ Pa (pounds per square inch(psi) equivalent),
[d]maximum elongation (%).
[e]Combined AAEM/CAM latex Sample No. 8,
[f]AAEM latex Sample No. 7, $T_g$ −2° C., 17 wt % AAEM.

Additional films 172–173 were prepared as described above and formulated as described in Table 19 below. Films were first allowed to dry for an initial 10 days at room temperature, then they were cured for 2 days either in UV or by heat at 50° C. No TEXANOL™ solvent was used in these formulations. The results are shown in Table 19 below. The data for films 172 and 173 also indicated crosslinking in the AAEM/CAM latex. UV curing shows effects on tensile strength and elongation.

TABLE 19

| Film | sens.[a] | cure | Tensile strength × 10⁵ Pa (psi) | max. elong. (%) |
|---|---|---|---|---|
| 172 - AAEM/CAM latex[b] | yes | rt | 1.59 (23) | 1761 |
| 172 - AAEM/CAM latex[b] | yes | heat | 2.55 (37) | 1134 |
| 172 - AAEM/CAM latex[b] | yes | UV | 22.06 (320) | 104 |
| 173 - AAEM/CAM latex[b] | no | rt | 1.65 (24) | 1499 |

TABLE 19-continued

| Film | sens.[a] | cure | Tensile strength × 10⁵ Pa (psi) | max. elong. (%) |
|---|---|---|---|---|
| 173 - AAEM/CAM latex[b] | no | heat | 2.14 (31) | 1655 |
| 173 - AAEM/CAM latex[b] | no | UV | 32.41 (470) | 110 |

[a]UV-sensitive: 0.3 wt % PHOTOMER ™ 81 was used (mixture of benzophenone and 4-methylbenzophenone).
[b]Combined AAEM/CAM latex Sample No. 11.

Additional films 158–165 were prepared as described above and formulated as described in Table 20 below. Films were cured for 3 weeks first at room temperature, and then subjected for a 3 day UV post-cure. CAM latexes, Sample No. 12 and Sample No. 13, showed an increase in tensile strength and elongation when treated with a UV post-cure. Data of Cobalt-dried films of blends with AAEM showed a reduced amount of crosslinking, but upon post-UV curing, tensile data were in accord with crosslinking. Overall, of all CAM latexes prepared, Sample No. 4 worked better in terms of crosslinking in conjunction with AAEM. Without being limited by theory, this was the only CAM latex with 100% conversion in the synthesis, and the other samples most probably contain residual amounts of CAM that act as a plasticizer, resulting in low tensile data.

TABLE 20

| Film | Co[a] | Ten. St.[b] | ME[c] | WA[d] | Sol.[e] |
|---|---|---|---|---|---|
| 158 - CAM(T$_g$-20)[f] | yes | 20.41 (296) | 595 | 13.09 | 1.06 |
| 158 - CAM(T$_g$-20)[f] | yes | 33.85 (491) | 625 | UV postcure | |
| 159 - CAM(T$_g$-20)[f] | no | 22.20 (322) | 462 | 10.69 | 1.01 |
| 159 - CAM(T$_g$-20)[f] | no | 35.78 (519) | 552 | UV postcure | |
| 160 - CAM(T$_g$-7)[f] | yes | 10.14 (147) | 941 | 11.29 | 1.23 |
| 160 - CAM(T$_g$-7)[f] | yes | 27.30 (396) | 688 | UV postcure | |
| 161 - CAM(T$_g$-7)[f] | no | 15.1 (219) | 665 | 10.81 | 1.03 |
| 161 - CAM(T$_g$-7)[f] | no | 13.10 (190) | 640 | UV postcure | |
| 162 - AAEM(30,T$_g$-7) + CAM(T$_g$-20)[f] | yes | 11.86 (172) | 204 | 17.24 | 1.25 |
| 162 - AAEM(30,T$_g$-7) + CAM(T$_g$-20)[f] | yes | 75.29 (1092) | 138 | UV postcure | |
| 163 - AAEM(30,T$_g$-7) + CAM(T$_g$-20)[f] | no | 20.96 (304) | 402 | 15.96 | 0.95 |
| 163 - AAEM(30,T$_g$-7) + CAM(T$_g$-20)[f] | no | 80.46 (1167) | 125 | UV postcure | |
| 164 - AAEM(30,T$_g$-7) + CAM(T$_g$-7)[f] | yes | 10.14 (147) | 335 | 12.42 | 0.91 |
| 164 - AAEM(30,T$_g$-7) + CAM(T$_g$-7)[f] | yes | 84.74 (1229) | 154 | UV postcure | |
| 165 - AAEM(30,T$_g$-7) + CAM(T$_g$-7)[f] | no | 11.59 (168) | 454 | 17.66 | 1.40 |
| 165 - AAEM(30,T$_g$-7) + CAM(T$_g$-7)[f] | no | 84.18 (1221) | 138 | UV postcure | |

[a]NUXTRA ™, a 6% solution of cobalt octanoate. 0.75% was used where indicated.
[b]Tensile Strength ×10⁵ Pa (pounds per square inch (psi) equivalent),
[c]max. elongation (%),
[d]water absorption (%),
[e]solubility (%).
[f]Latex blends: "AAEM" and "CAM" denote latexes with these functionalities. AAEM (30, T$_g$ -7) contains 30% AAEM (Sample No. 9), AAEM (17, T$_g$ -2) contains 17% AAEM (No. 7), CAM (T$_g$ -20) was latex Sample No. 12 and CAM (T$_g$ -7) No. 13.

It should be appreciated that the present invention is not limited to the specific embodiments described above, but includes variations, modifications and equivalent embodiments defined by the following claims.

What is claimed is:

1. A composition comprising a polymer, wherein the polymer comprises at least one of:

a. a blend of a first polymer comprising a reaction product of acetoacetoxyethyl (meth)acrylate monomer and a second polymer comprising a reaction product of castor oil (meth)acrylate monomer, and b. a third polymer comprising a reaction product of acetoacetoxyethyl (meth)acrylate monomer and castor oil (meth)acrylate monomer.

2. The composition of claim 1, wherein the composition is curable by at least one of auto-oxidation and actinic radiation.

3. The composition of claim 2, wherein the composition is additionally curable by heat.

4. The composition of claim 1 further comprising a reaction product of the composition with at least one of ammonia and an amine such that at least a portion of the acetoacetoxyethyl (meth)acrylate moieties in the polymer are converted to a corresponding enamine.

5. The composition of claim 1 further comprising at least one of a drier and an actinic radiation curing agent.

6. The composition of claim 5, wherein the drier is selected from the group consisting of a polyvalent metal salt, a neutral soap of the formula $(R_x$—$COO^-)_2M^{2+}$; a neutral soap of the formula $(R_x$—$COO^-)_3M^{3+}$; an acid soap of the formula $(R_x$—$COO^-)_2M^{2+}$.$R_x$—COOH, an acid soap of the formula $(R_x$—$COO^-)_3M^{3+}$.$R_x$—COOH; a basic soap of the formula $(R_x$—$COO^-)_2M^{2+}$.OH; an organic complexed or mixed soap of the formula $(R_x$—$COO^-)(R'_x$—COO—$)M^{2+}$; an organic complexed or mixed soap of the formula $(R_x$—$COO^-)(R'_x$—$COO^-)(R''_x$—$COO^-)M^{3+}$; an inorganic/organic complexed or mixed soap of the formula O—$M^{2+}$—O—CO—$R_x$; an inorganic/organic complexed or mixed soap of the formula Y—O—$M^{2+}$—O—CO—$R_x$; an inorganic/organic complexed or mixed soap of the formula O—$M^{2+}$—O—CO—$R_x$; and mixtures thereof;

wherein $R_x$—$COO^-$, $R'_x$—$COO^-$, and $R''_x$—$COO^-$ are selected from the group consisting of aliphatic carboxylic acid ions having 6 to 20 carbon atoms, naphthenic acids having 12–14 carbon atoms, 2-ethylhexanoic acid, neodecanoic acid, and mixtures thereof;

x is an integer from 6 to 20;
M=metal ion; and
Y=phosphorus or boron.

7. The composition of claim 5, wherein the drier is present in an amount from about 0.01% to about 1% metal content by weight of the composition.

8. The composition of claim 5, wherein the drier is present and the composition further comprises a volatile stabilizer comprising at least one of a ketone oxime and a hindered aldehyde oxime.

9. The composition of claim 5, wherein the actinic radiation curing agent is selected from the group consisting of benzophenone, 4-methylbenzophenone, benzoyl benzoate, phenylacetophenones, 2,2-dimethoxy-2-phenyl-acetophenone, amine modified diacrylates, and mixtures thereof.

10. The composition of claim 5, wherein the actinic radiation curing agent is present in an amount from about 0.01% to about 1% by weight of the composition.

11. The composition of claim 1, wherein at least one of:
   a. the first polymer comprises a reaction product of the acetoacetoxyethyl (meth)acrylate with at least one additional monomer;
   b. the second polymer comprises a reaction product of the castor oil (meth)acrylate with at least one additional monomer; and
   c. the third polymer comprises a reaction product of the acetoacetoxyethyl (meth)acrylate and the castor oil (meth)acrylate with at least one additional monomer;
wherein the additional monomer is selected from the group consisting of ethylenically unsaturated monomers, (meth) acrylates, hydroxyl containing (meth)acrylates, vinyl aromatics, vinyl halides, vinylidene halides, esters of vinyl alcohol and $C_1$–$C_{18}$ monocarboxylic acids, esters of allyl alcohol and $C_1$–$C_{18}$ monocarboxylic acids, ethylenically unsaturated monomers containing at least one carboxylic acid group, salts of ethylenically unsaturated monomers containing at least one carboxylic acid group, anhydrides of ethylenically unsaturated dicarboxylic acids, nitrites of ethylenically unsaturated carboxylic acids, ethylenically unsaturated monomers containing at least one sulfonic acid group, salts of ethylenically unsaturated monomers containing at least one sulfonic acid group, ethylenically unsaturated monomers containing at least one amide group, dienes, alkyds, nitrogen-containing adhesion monomers, glycidyl esters of ethylenically unsaturated monomers, vinyl esters of the formula $CH_2=CH-O-(CO)-C-(R_{100})_3$ wherein $R_{100}$ is an alkyl, alkylaminoalkyl group-containing (meth) acrylic monomers, alkyl esters of (meth)acrylic acid containing an ether bond in the alkyl, urethane esters of (meth) acrylic acid, urea esters of (meth)acrylic acid, vinyl monomers, isocyanate esters of (meth)acrylic acid, carbonyl containing monomers, monomers containing hydrolyzable Si-organic bonds, vinyl esters of neo acids, enamines, alkyl crotonates, phosphate (meth)acrylates, (meth)acryloxy benzophenones, salts of any of the preceding, and mixtures thereof.

12. The composition of claim 1, wherein at least one of
   a. the first polymer comprises a reaction product of the acetoacetoxyethyl (meth)acrylate with at least one additional monomer;
   b. the second polymer comprises a reaction product of the castor oil (meth)acrylate with at least one additional monomer; and
   c. the third polymer comprises a reaction product of the acetoacetoxyethyl (meth)acrylate and the castor oil (meth)acrylate with at least one additional monomer;
wherein the additional monomer is selected from the group consisting of methyl (meth)acrylate, ethyl (meth)acrylate, propyl (meth)acrylate, n-butyl (meth)acrylate, isobutyl (meth)acrylate, t-butyl (meth)acrylate, pentyl (meth) acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, nonyl (meth) acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth) acrylate, norbornyl (meth)acrylate, 4-tertbutylcyclohexyl (meth)acrylate, 3,3,5-trimethylcyclohexyl (meth)acrylate, dimethyl maleate, n-butyl maleate, alkylene glycol di(meth) acrylates, ethylene glycol di(meth)acrylate, 1,3-butylene glycol di(meth)acrylate, 1,4-butylene glycol di(meth) acrylate, propylene glycol (meth)acrylate, 1,6-hexanediol di(meth)acrylate, dipropylene glycol di(meth)acrylate, tripropylene glycol di(meth)acrylate, trimethylolpropane tri (meth)acrylate, cyclopentadienyl (meth)acrylate, carbodiimide (meth)acrylate, t-butylaminoethyl (meth)acrylate, 2-t-butylaminoethyl (meth)acrylate, N,N-dimethylaminoethyl (meth)acrylate, 2-hydroxyethyl (meth)acrylate, hydroxypropyl (meth)acrylates, hydroxybutyl (meth)acrylates, (meth) acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicarboxylic acid, 1,3-cyclohexanedicarbocylic acid, maleic anhydride, succinic anhydride, phthalic anhydride, tetrahydrophthalic anhydride, hexahydrophthalic anhydride, tetrabromophthalic anhydride, trimellitic anhydride, pyromellitic anhydride, 1,4,5,6,7,7-hexachloro-5-norbornene-2,3-dicarboxylic anhydride, methyl hydrogen fumarate, benzyl hydrogen maleate, butyl hydrogen maleate, octyl hydrogen itaconate, dodecyl hydrogen citraconate, butyl fumarate, octyl fumarate, octyl maleate, dibutyl maleate, dioctyl maleate, vinyl acetate, vinyl acetoacetate, t-butylacetoacetate, ethylacetoacetate, vinyl propionate, vinyl n-butyrate, vinyl heptanoate, vinyl perlogonate, vinyl 3,6-dioxaheptanoate, vinyl 3,6,9-trioxanundecanote, vinyl laurate, and vinyl stearate, allyl acetate, allyl propionate, allyl (meth)acrylate, allyl n-butyrate, allyl laurate, allyl stearate, diallyl maleate, diallyl fumarate, (meth) acrylonitrile, styrene, α-methyl styrene, o-chlorostyrene, chloromethyl styrene, α-phenyl styrene, styrene sulfonic acid, para-acetoxystyrene, divinylbenzene, diallyl phthalate, vinyl toluene, vinyl naphthalene, butadiene, isoprene, chloroprene, vinyl sulfonic acid, arylsulfonic acid, sulfopropyl acrylate, (meth)acryloyloxynaphthalenesulfonic acid, 2-acrylamido-2-methylpropanesulfonic acid, acryloyloxybenzenesulfonic acid, (meth)acrylamide, dimethyl (meth) acrylamide, N-alkyl (meth)acrylamide, N-butylacrylamide, tetramethylbutylacrylamide, N-alkylol (meth)acrylamide, N-methylol (meth)acrylamide, N-octyl acrylamide, methylene bis acrylamide, diacetoneacrylamide, ethyl imidazolidon (meth)acrylate, N,N-dimethylaminopropyl-methacrylamide, alkyds, dihydrazides of oxalic acid, dihydrazides of malonic acid, dihydrazides of succinic acid, dihydrazides of glutaric acid, dihydrazides of adipic acid, dihydrazides of sebacic acid, ureido (meth)acrylates, (meth) acrylates with at least one of urea and thiourea in the side chains, acrylic allophanes, aminoethyl (meth)acrylate, dimethylaminoethyl (meth)acrylate, diethylaminoethyl (meth)

acrylate, dimethylaminopropyl (meth)acrylate, 3-dimethylamino-2,2-dimethylpropyl (meth)acrylate, 2-N-morpholinoethyl (meth)acrylate, 2-N-piperidinoethyl (meth)acrylate, N-(3-dimethylaminopropyl)(meth)acrylamide, N-dimethylaminoethyl(meth)acrylamide, N-diethylaminoethyl(meth)acrylamide, N-(4-morpholinomethyl)(meth)acrylamide, vinylimidazole, N-(2-(meth)acryloyloxyethyl)ethyleneurea, N-(β-acrylamidoethyl)ethyleneurea, N-2-(allylcarbamato) aminoethylimidazolidinone, N-vinylethyleneurea, N-(3-allyloxy-2-hydroxypropyl)aminoethylethyleneurea, N-vinyloxyethyleneurea, N-methacryloyloxyacetoxy-ethylethyleneurea, N-(acrylamidoethylene)ethyleneurea, N-(methacrylamidoethylene)-ethyleneurea, 1-(2-methacryloyloxyethyl)imidazolin-2-one, N-(methacrylamidoethyl)ethyleneurea, acrolein, methacrolein, vinyl silanes, methacryloyloxypropyltrimethoxysilane, vinyltrimethoxysilane, methyltrimethoxysilane, propyltrimethoxysilane, vinyl tris (2 methoxyethoxy silane), vinyl triisopropoxysilane, 3-aminopropyltrimethoxysilane, sodium phosphate (meth)acrylate, alkylester phosphate (meth)acrylate, ethoxylated alkylester phosphate (meth)acrylate, 1,4-butanediol bisacrylate, vinyl acetoacetamide, vinyl 1,3-diketone, vinyl pyrrolidone, vinyl pyridine, vinyl pyrazine, vinyl piperadiene, vinyl piperidone, vinyl pyrimidine, vinyl pyrrole, vinyl imidazole, vinyl caprolactam, vinyl oxazole, vinyl thiazole, vinyl morpholine, triallyl cyanurate, glycidyl (meth)acrylate, 3-isopropenyl-α-α-dimethylbenzyl isocyanate, ethylene, propylene, a monomer of the following structure (I):

$$R_1-(C)_a-\underset{R_3}{\overset{R_2}{C}}-(\underset{R_3}{\overset{R_2}{C}}=\overset{R_4}{\underset{}{C}})_b-(C)_{a'}-\underset{O}{\overset{R_2}{C}}-(\underset{R_3}{\overset{R_2}{C}}=\overset{R_4}{\underset{}{C}})_{b'}-(C)_c-R_8; \quad \text{(I)}$$

with $C=O$, $C=C$, $R_9$, $R_{10}$, $R_{11}$ wherein (a) $R_1$, $R_2$, $R_3$, $R_4$, $R_5$, $R_6$, and $R_7$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(b) $R_8$ is selected from the group consisting of:
—CN;
—COOR;
—CH$_2$OH;
—CH$_2$OR;
—CONR'R"; and
—CH$_2$NR'R";

wherein (i) R is selected from the group consisting of:
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms;
linear or branched alkyl and fluoroalkyl groups having the formula $C_nH_xF_y$, wherein n is an integer from 1 to 10, x and y are integers from 0 to 2n+1, and the sum of x and y is 2n+1; and a multifunctional moiety having the structure (II) or (III):

$$\begin{array}{l} R_{12}-CH_2 \\ | \\ R_{13}-CH \\ | \\ -CH_2 \end{array} \quad \text{or} \quad \text{(II)}$$

$$\begin{array}{l} R_{12}-CH_2 \\ | \\ -CH \\ | \\ R_{13}-CH_2 \end{array} \quad \text{(III)}$$

wherein $R_{12}$ and $R_{13}$ are the same or different and are independently selected from the group consisting of:
a substituted or unsubstituted, saturated or unsaturated fatty acid chain; acrylic and substituted acrylic;
a linear or branched alkyl or alkenyl carboxylic acid moiety having 2 to 30 carbon atoms; and monoalkyl esters of maleic and fumaric acids, wherein alkyl group contains 1 to 4 carbon atoms;

(ii) R', and R" are the same or different and are independently selected from the group consisting of:
hydrogen;
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(c) $R_9$, $R_{10}$, and $R_{11}$ are the same or different and are independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1; and (d) a, a', b, b', and c, are integers, wherein a and a' have a value of from 0 to 10, b and b' have a value of 0 to 2 with the proviso that sum of b and b' is 1 or 2, and c has a value of from 0 to 20, a monomer of the following structure (V):

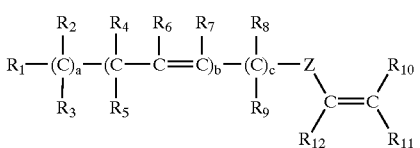

(V)

wherein (a) $R_1$, $R_2$, $R_3$, $R_4$, $R_5$, $R_6$, $R_7$, $R_8$, and $R_9$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(b) Z is selected from the group consisting of:
—(CO)—O—;
—(CO)—O—R—O—(CO)—;
—(CO)—O—R—(CO)—O—;
—(CO)—O—R—O—;
—CH$_2$O—;
—CH$_2$O—(CO)—;
—CH$_2$O—R—O—;
—CH$_2$O—R—O—(CO)—;
—CH$_2$O—R—(CO)—O—;
—(CO)—NR'—R—O—(CO)—;
—(CO)—NR'—R—(CO)—O—;
—(CO)—NR'—R—O—;
—CH$_2$NR'—R—O—(CO)—;
—CH$_2$NR'—R—(CO)—O—;
—CH$_2$NR'—R—O—; and
—CH$_2$NR'—(CO)—;
wherein
(i) R is a divalent organic moiety selected from the group consisting of arylene and substituted arylene group having 6 to 10 carbon atoms; and linear or branched alkylene and fluoroalkylene groups having the formula $C_nH_xF_y$, wherein n is an integer from 1 to 10, x and y are integers from 0 to 2n, and the sum of x and y is 2n; and
(ii) R' is selected from the group consisting of:
hydrogen;
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(c) $R_{10}$, $R_{11}$, and $R_{12}$ are the same or different and independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1; and (d) a, b, and c, are integers, wherein a and c have a value of from 0 to 20, and sum of a and c is at least 10, and b has a value of 1 or 2, a monomer of the following structure (VI):

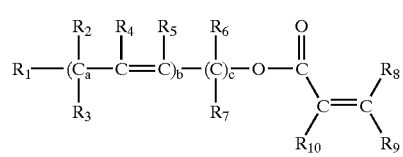

(VI)

wherein (a) $R_1$, $R_2$, $R_3$, $R_4$, $R_5$, $R_6$, and $R_7$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(b) $R_8$, $R_9$, and $R_{10}$ are the same or different and are independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 8, x and y are integers from 0 to 2n+1, and the sum of x and y is 2n+1; and (c) a, b, and c, are integers, wherein a and c have a value of from 0 to 20, and sum of a and c is at least 8, and b has a value of 1 or 2, salts of any of the preceding monomers, and mixtures thereof.

13. The composition of claim 12, wherein the monomer of structure (I) has the following structure (IV)

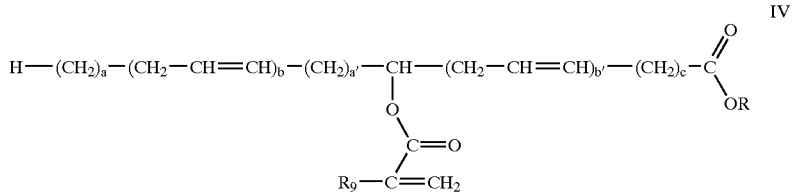

IV wherein R is at least one member selected from the group consisting of methyl, multifunctional moiety II, multifunctional moiety III, and an ethylenically unsaturated carboxylic acid ester of structure IVa:

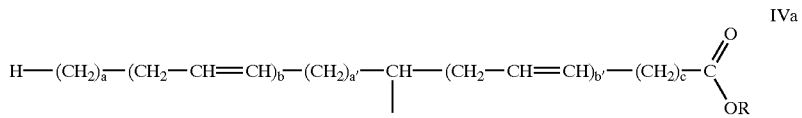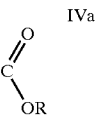

IVa and mixtures thereof, wherein, a, a', b, b', and c are integers, wherein a and a' have a value of from 2 to 4, b and b' have a value of 0 to 2 with the proviso that the sum of b and b' is 1 or 2, and c has a value of 5 to 12; and wherein when R is the ethylenically unsaturated carboxylic acid ester of formula IVa, optionally, at least one of dimers, trimers, and tetramers are formed.

14. The composition of claim 1 further comprising at least one additive selected from the group consisting of surfactants, wetting agents, protective colloids, fillers, coloring agents, antiseptics, biocides, dispersing agents, thickening agents, thixotropic agents, antifreezing agents, pH adjusting agents, corrosion inhibitors, ultraviolet light stabilizers, crosslinking promoters, antioxidants, and mixtures thereof.

15. The composition of claim 1 further comprising at least one additional polymer selected from the group consisting of (meth)acrylates, styrenics, styrene-butadienes, polyurethanes, polyethers, polyesters, melamine-formaldehyde polymers, vinyl halides, vinylidene halides, poly(ethyleneimines), poly(vinyl amines), and mixtures thereof.

16. The composition of claim 1, wherein each of the polymer reaction products is at least one of a batch polymerization reaction product, a seedless semi-batch polymerization reaction product, a seeded semi-batch polymerization reaction product, and a continuous polymerization reaction product.

17. The composition of claim 1, wherein each of the polymer reaction product is at least one of a single stage reaction product and a multiple stage reaction product.

18. The composition of claim 1, wherein a total number of all castor oil (meth)acrylate moieties ranges from about 1% to about 50% based on a total number of all moieties in all reaction products, and wherein a total number of all acetoacetoxyethyl (meth)acrylate moieties ranges from about 1% to about 60% based on the total number of all moieties in all reaction products.

19. The composition of claim 1, wherein a ratio of a total number of all castor oil (meth)acrylate moieties in all reaction products to a total number of all acetoacetoxyethyl (meth)acrylate moieties ranges from about 0.1:1 to about 10:1.

20. A method comprising:
a. applying the composition of claim 1 to a substrate, and
b. curing the composition by at least one of auto-oxidation and actinic radiation;

wherein when the composition is cured by auto-oxidation, optionally a drier is added to the composition prior to applying, and wherein when the composition is cured by actinic radiation, optionally an actinic radiation curing agent is added to the composition prior to applying.

21. The method of claim 20, wherein the composition is curable by at least one of auto-oxidation and actinic radiation.

22. The method of claim 21, wherein the composition is additionally curable by heat.

23. The method of claim 20 further comprising a reaction product of the composition with at least one of ammonia and an amine such that at least a portion of the acetoacetoxyethyl (meth)acrylate moieties in the polymer are converted to a corresponding enamine.

24. The method of claim 20 further comprising at least one of a drier and an actinic radiation curing agent.

25. The method of claim 24, wherein the drier is selected from the group consisting of a polyvalent metal salt, a neutral soap of the formula $(R_x\text{---}COO^-)_2M^{2+}$; a neutral soap of the formula $(R_x\text{---}COO^-)_3M^{3+}$; an acid soap of the formula $(R_x\text{---}COO^-)_2M^{2+}.R_x\text{---}COOH$, an acid soap of the formula $(R_x\text{---}COO^-)_3M^{3+}.R_x\text{---}COOH$; a basic soap of the formula $(R_x\text{---}COO^-)_2M^{2+}.OH$; an organic complexed or mixed soap of the formula $(R_x\text{---}COO^-)(R'_x\text{---}COO\text{---})M^{2+}$; an organic complexed or mixed soap of the formula $(R_x\text{---}COO^-)(R'_x\text{---}COO^-)(R''_x\text{---}COO^-)M^{3+}$; an inorganic/organic complexed or mixed soap of the formula $O\text{---}M^{2+}\text{---}O\text{---}CO\text{---}R_x$; an inorganic/organic complexed or mixed soap of the formula $Y\text{---}O\text{---}M^{2+}\text{---}O\text{---}CO\text{---}R_x$; an inorganic/organic complexed or mixed soap of the formula $O\text{---}M^{2+}\text{---}O\text{---}CO\text{---}R_x$; and mixtures thereof;
wherein
$R_x\text{---}COO^-$, $R'_x\text{---}COO^-$, and $R''_x\text{---}COO^-$ are selected from the group consisting of aliphatic carboxylic acid ions having 6 to 20 carbon atoms, naphthenic acids having 12–14 carbon atoms, 2-ethylhexanoic acid, neodecanoic acid, and mixtures thereof;
x is an integer from 6 to 20;
M=metal ion; and
Y=phosphorus or boron.

26. The method of claim 24, wherein the drier is present in an amount from about 0.01% to about 1% metal content by weight of the composition.

27. The method of claim 24, wherein the drier is present and the composition further comprises a volatile stabilizer comprising at least one of a ketone oxime and a hindered aldehyde oxime.

28. The method of claim 24, wherein the actinic radiation curing agent is selected from the group consisting of benzophenone, 4-methylbenzophenone, benzoyl benzoate, phenylacetophenones, 2,2-dimethoxy-2-phenyl-acetophenone, amine modified diacrylates, and mixtures thereof.

29. The method of claim 24, wherein the actinic radiation curing agent is present in an amount from about 0.01% to about 1% by weight of the composition.

30. The method of claim 20, wherein at least one of:
 a. the first polymer comprises a reaction product of the acetoacetoxyethyl (meth)acrylate with at least one additional monomer;
 b. the second polymer comprises a reaction product of the castor oil (meth)acrylate with at least one additional monomer; and
 c. the third polymer comprises a reaction product of the acetoacetoxyethyl (meth)acrylate and the castor oil (meth)acrylate with at least one additional monomer;
wherein the additional monomer is selected from the group consisting of ethylenically unsaturated monomers, (meth)acrylates, hydroxyl containing (meth)acrylates, vinyl aromatics, vinyl halides, vinylidene halides, esters of vinyl alcohol and $C_1$–$C_{18}$ monocarboxylic acids, esters of allyl alcohol and $C_1$–$C_{18}$ monocarboxylic acids, ethylenically unsaturated monomers containing at least one carboxylic acid group, salts of ethylenically unsaturated monomers containing at least one carboxylic acid group, anhydrides of ethylenically unsaturated dicarboxylic acids, nitriles of ethylenically unsaturated carboxylic acids, ethylenically unsaturated monomers containing at least one sulfonic acid group, salts of ethylenically unsaturated monomers containing at least one sulfonic acid group, ethylenically unsaturated monomers containing at least one amide group, dienes, alkyds, nitrogen-containing adhesion monomers, glycidyl esters of ethylenically unsaturated monomers, vinyl esters of the formula $CH_2=CH-O-(CO)-C-(R_{100})_3$ wherein $R_{100}$ is an alkyl, alkylaminoalkyl group-containing (meth)acrylic monomers, alkyl esters of (meth)acrylic acid containing an ether bond in the alkyl, urethane esters of (meth)acrylic acid, urea esters of (meth)acrylic acid, vinyl monomers, isocyanate esters of (meth)acrylic acid, carbonyl containing monomers, monomers containing hydrolyzable Si-organic bonds, vinyl esters of neo acids, enamines, alkyl crotonates, phosphate (meth)acrylates, (meth)acryloxy benzophenones, salts of any of the preceding, and mixtures thereof.

31. The method of claim 20, wherein at least one of
 a. the first polymer comprises a reaction product of the acetoacetoxyethyl (meth)acrylate with at least one additional monomer;
 b. the second polymer comprises a reaction product of the castor oil (meth)acrylate with at least one additional monomer; and
 c. the third polymer comprises a reaction product of the acetoacetoxyethyl (meth)acrylate and the castor oil (meth)acrylate with at least one additional monomer;
wherein the additional monomer is selected from the group consisting of methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, nonyl (meth) acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth)acrylate, norbornyl (meth)acrylate, 4-tertbutylcyclohexyl (meth)acrylate, 3,3,5-trimethylcyclohexyl (meth)acrylate, dimethyl maleate, n-butyl maleate, alkylene glycol di(meth)acrylates, ethylene glycol di(meth)acrylate, 1,3-butylene glycol di(meth)acrylate, 1,4-butylene glycol di(meth)acrylate, propylene glycol (meth)acrylate, 1,6-hexanediol di(meth)acrylate, dipropylene glycol di(meth)acrylate, tripropylene glycol di(meth)acrylate, trimethylolpropane tri (meth)acrylate, cyclopentadienyl (meth)acrylate, carbodiimide (meth)acrylate, t-butylaminoethyl (meth)acrylate, 2-t-butylaminoethyl (meth)acrylate, N,N-dimethylaminoethyl (meth)acrylate, 2-hydroxyethyl (meth)acrylate, hydroxypropyl (meth)acrylates, hydroxybutyl (meth)acrylates, (meth)acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicarboxylic acid, 1,3-cyclohexanedicarbocylic acid, maleic anhydride, succinic anhydride, phthalic anhydride, tetrahydrophthalic anhydride, hexahydrophthalic anhydride, tetrabromophthalic anhydride, trimellitic anhydride, pyromellitic anhydride, 1,4,5,6,7,7-hexachloro-5-norbornene-2,3-dicarboxylic anhydride, methyl hydrogen fumarate, benzyl hydrogen maleate, butyl hydrogen maleate, octyl hydrogen itaconate, dodecyl hydrogen citraconate, butyl fumarate, octyl fumarate, octyl maleate, dibutyl maleate, dioctyl maleate, vinyl acetate, vinyl acetoacetate, t-butylacetoacetate, ethylacetoacetate, vinyl propionate, vinyl n-butyrate, vinyl heptanoate, vinyl perlogonate, vinyl 3,6-dioxaheptanoate, vinyl 3,6,9-trioxanundecanote, vinyl laurate, and vinyl stearate, allyl acetate, allyl propionate, allyl (meth)acrylate, allyl n-butyrate, allyl laurate, allyl stearate, diallyl maleate, diallyl fumarate, (meth)acrylonitrile, styrene, α-methyl styrene, o-chlorostyrene, chloromethyl styrene, α-phenyl styrene, styrene sulfonic acid, para-acetoxystyrene, divinylbenzene, diallyl phthalate, vinyl toluene, vinyl naphthalene, butadiene, isoprene, chloroprene, vinyl sulfonic acid, arylsulfonic acid, sulfopropyl acrylate, (meth)acryloyloxynaphthalenesulfonic acid, 2-acrylamido-2-methylpropanesulfonic acid, acryloyloxybenzenesulfonic acid, (meth)acrylamide, dimethyl (meth)acrylamide, N-alkyl (meth)acrylamide, N-butylacrylamide, tetramethylbutylacrylamide, N-alkylol (meth)acrylamide, N-methylol (meth)acrylamide, N-octyl acrylamide, methylene bis acrylamide, diacetoneacrylamide, ethyl imidazolidon (meth)acrylate, N,N-dimethylaminopropylmethacrylamide, alkyds, dihydrazides of oxalic acid, dihydrazides of malonic acid, dihydrazides of succinic acid, dihydrazides of glutaric acid, dihydrazides of adipic acid, dihydrazides of sebacic acid, ureido (meth)acrylates, (meth)acrylates with at least one of urea and thiourea in the side chains, acrylic allophanes, aminoethyl (meth)acrylate, dimethylaminoethyl (meth)acrylate, diethylaminoethyl (meth)acrylate, dimethylaminopropyl (meth)acrylate, 3-dimethylamino-2,2-dimethylpropyl (meth)acrylate, 2-N-morpholinoethyl (meth)acrylate, 2-N-piperidinoethyl (meth)acrylate, N-(3-dimethylaminopropyl)(meth)acrylamide, N-dimethylaminoethyl(meth)acrylamide, N-diethylaminoethyl(meth)acrylamide, N-(4-morpholinomethyl)(meth)acrylamide, vinylimidazole, N-(2-(meth)acryloyloxyethyl)ethyleneurea, N-(β-acrylamidoethyl)ethyleneurea, N-2-(allylcarbamato) aminoethylimidazolidinone, N-vinylethyleneurea, N-(3-allyloxy-2-hydroxypropyl)aminoethylethyleneurea, N-vinyloxyethyleneurea, N-methacryloyloxyacetoxyethylethyleneurea, N-(acrylamidoethylene)ethyleneurea, N-(methacrylamidoethylene)-ethyleneurea, 1-(2-methacryloyloxyethyl)imidazolin-2-one, N-(methacrylamidoethyl)ethyleneurea, acrolein, methacrolein, vinyl silanes, methacryloyloxypropyltrimethoxysilane, vinyltrimethoxysilane, methyltrimethoxysilane, propyltrimethoxysilane, vinyl tris (2 methoxyethoxy silane), vinyl triisopropoxysilane, 3-aminopropyltrimethoxysilane, sodium phosphate (meth)acrylate, alkylester phosphate (meth)acrylate, ethoxylated alkylester phosphate (meth)acrylate, 1,4-butanediol bisacrylate, vinyl acetoacetamide, vinyl 1,3-diketone, vinyl pyrrolidone, vinyl pyridine, vinyl pyrazine, vinyl piperadiene, vinyl piperidone, vinyl pyrimidine, vinyl pyrrole, vinyl imidazole, vinyl caprolactam, vinyl oxazole, vinyl thiazole, vinyl morpholine, triallyl cyanurate, glycidyl (meth)acrylate, 3-isopropenyl-α-α-dimethylbenzyl isocyanate, ethylene, propylene, a monomer of the following structure(I):

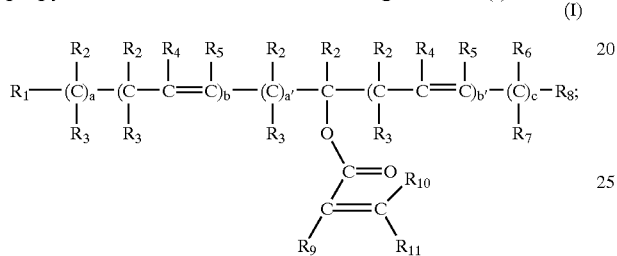

(I)

wherein (a) $R_1$, $R_2$, $R_3$, $R_4$, $R_5$, $R_6$, and $R_7$, are the same or different and are each independently selected from the group consisting of:
hydrogen;
alkoxy group having 1 to 10 carbon atoms;
alkoxyalkyl group having 1 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(b) $R_8$ is selected from the group consisting of:
—CN;
—COOR;
—CH$_2$OH;
—CH$_2$OR;
—CONR'R"; and
—CH$_2$NR'R";
wherein
(i) R is selected from the group consisting of:
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms;
linear or branched alkyl and fluoroalkyl groups having the formula $C_nH_xF_y$, wherein n is an integer from 1 to 10, x and y are integers from 0 to 2n+1, and the sum of x and y is 2n+1; and a multifunctional moiety having the structure (II) or (III):

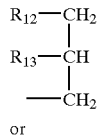

(II)

or

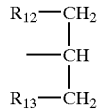

(III)

wherein $R_{12}$ and $R_{13}$ are the same or different and are independently selected from the group consisting of:
a substituted or unsubstituted, saturated or unsaturated fatty acid chain; acrylic and substituted acrylic;
a linear or branched alkyl or alkenyl carboxylic acid moiety having 2 to 30 carbon atoms; and monoalkyl esters of maleic and fumaric acids, wherein alkyl group contains 1 to 4 carbon atoms;
(ii) R', and R" are the same or different and are independently selected from the group consisting of:
hydrogen;
phenyl and substituted phenyl;
tolyl and substituted tolyl;
benzyl and substituted benzyl;
alkoxyalkyl group having 1 to 10 carbon atoms;
hydroxyalkyl group having 1 to 10 carbon atoms;
acyloxyalkyl group having 1 to 10 carbon atoms;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1;

(c) $R_9$, $R_{10}$, and $R_{11}$ are the same or different and are independently selected from the group consisting of:
hydrogen;
a carboxylate of the formula —COOR, wherein R is alkyl group having 1 to 10 carbon atoms, or phenyl and substituted phenyl;
phenyl and substituted phenyl;
tolyl and substituted tolyl;
benzyl and substituted benzyl;
a linear or branched alkenyl group having 2 to 10 carbon atoms; and
linear or branched alkyl and fluoroalkyl groups having the formula $C_nH_xF_y$, wherein n is an integer from 1 to 10, x and y are integers from 0 to 2n+1, and the sum of x and y is 2n+1; and (d) a, a', b, b', and c, are integers, wherein a and a' have a value of from 0 to 10, b and b' have a value of 0 to 2 with the proviso that sum of b and b' is 1 or 2, and c has a value of from 0 to 20, a monomer of the following structure (V):

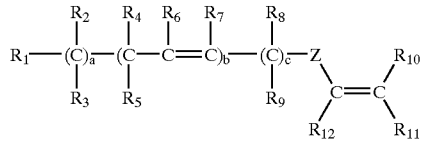

(V)

wherein
 (a) $R_1$, $R_2$, $R_3$, $R_4$, $R_5$, $R_6$, $R_7$, $R_8$, and $R_9$, are the same or different and are each independently selected from the group consisting of:
  hydrogen;
  alkoxy group having 1 to 10 carbon atoms;
  alkoxyalkyl group having 1 to 10 carbon atoms; and
  linear or branched alkyl and fluoroalkyl groups having the formula $C_nH_xF_y$, wherein n is an integer from 1 to 10, x and y are integers from 0 to 2n+1, and the sum of x and y is 2n+1;
 (b) Z is selected from the group consisting of:
  —(CO)—O—;
  —(CO)—O—R—O—(CO)—;
  —(CO)—O—R—(CO)—O—;
  —(CO)—O—R—O—;
  —CH$_2$O—;
  —CH$_2$O—(CO)—;
  —CH$_2$O—R—O—;
  —CH$_2$O—R—O—(CO)—;
  —CH$_2$O—R—(CO)—O—;
  —(CO)—NR'—R—O—(CO)—;
  —(CO)—NR'—R—(CO)—O—;
  —(CO)—NR'—R—O—;
  —CH$_2$NR'—R—O—(CO)—;
  —CH$_2$NR'—R—(CO)—O—;
  —CH$_2$NR'—R—O—; and
  —CH$_2$NR'—(CO)—;
  wherein
   (i) R is a divalent organic moiety selected from the group consisting of: arylene and substituted arylene group having 6 to 10 carbon atoms; and linear or branched alkylene and fluoroalkylene groups having the formula $C_nH_xF_y$, wherein n is an integer from 1 to 10, x and y are integers from 0 to 2n, and the sum of x and y is 2n; and
   (ii) R' is selected from the group consisting of:
    hydrogen;
    phenyl and substituted phenyl;
    tolyl and substituted tolyl;
    benzyl and substituted benzyl;
    alkoxyalkyl group having 1 to 10 carbon atoms;
    hydroxyalkyl group having 1 to 10 carbon atoms;
    acyloxyalkyl group having 1 to 10 carbon atoms;
    a linear or branched alkenyl group having 2 to 10 carbon atoms; and
    linear or branched alkyl and fluoroalkyl groups having the formula $C_nH_xF_y$, wherein n is an integer from 1 to 10, x and y are integers from 0 to 2n+1, and the sum of x and y is 2n+1;
 (c) $R_{10}$, $R_{11}$, and $R_{12}$ are the same or different and are independently selected from the group consisting of:
  hydrogen;
  a carboxylate of the formula —COOR, wherein R is alkyl group having 1 to 10 carbon atoms, or phenyl and substituted phenyl;
  phenyl and substituted phenyl;
  tolyl and substituted tolyl;
  benzyl and substituted benzyl;
  a linear or branched alkenyl group having 2 to 10 carbon atoms; and
  linear or branched alkyl and fluoroalkyl groups having the formula $C_nH_xF_y$, wherein n is an integer from 1 to 10, x and y are integers from 0 to 2n+1, and the sum of x and y is 2n+1; and
 (d) a, b, and c, are integers, wherein a and c have a value of from 0 to 20, and sum of a and c is at least 10, and b has a value of 1 or 2, a monomer of the following structure (VI):

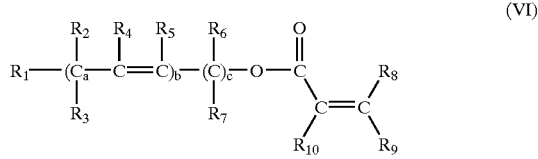

(VI)

wherein
 (a) $R_1$, $R_2$, $R_3$, $R_4$, $R_5$, $R_6$, and $R_7$, are the same or different and are each independently selected from the group consisting of:
  hydrogen;
  alkoxy group having 1 to 10 carbon atoms;
  alkoxyalkyl group having 1 to 10 carbon atoms; and
  linear or branched alkyl and fluoroalkyl groups having the formula $C_nH_xF_y$, wherein n is an integer from 1 to 10, x and y are integers from 0 to 2n+1, and the sum of x and y is 2n+1;
 (b) $R_8$, $R_9$, and $R_{10}$ are the same or different and are independently selected from the group consisting of:
  hydrogen;
  a carboxylate of the formula —COOR, wherein R is alkyl group having 1 to 10 carbon atoms, or phenyl and substituted phenyl;
  phenyl and substituted phenyl;
  tolyl and substituted tolyl;
  benzyl and substituted benzyl;
  a linear or branched alkenyl group having 2 to 10 carbon atoms; and
  linear or branched alkyl and fluoroalkyl groups having the formula $C_nH_xF_y$, wherein n is an integer from 1 to 8, x and y are integers from 0 to 2n+1, and the sum of x and y is 2n+1; and
 (c) a, b, and c, are integers, wherein a and c have a value of from 0 to 20, and sum of a and c is at least 8, and b has a value of 1 or 2, salts of any of the preceding monomers, and mixtures thereof.

32. The method of claim 31, wherein the monomer of structure (I) has the following structure (IV)

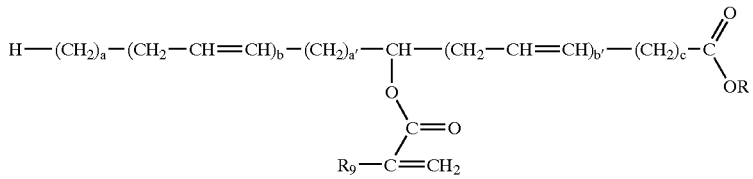

IV wherein R is at least one member selected from the group consisting of methyl, multifunctional moiety II, multifunctional moiety III, and an ethylenically unsaturated carboxylic acid ester of structure IVa:

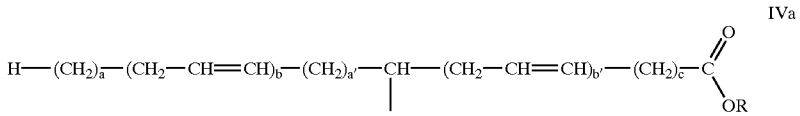

and mixtures thereof, wherein, a, a', b, b', and c are integers, wherein a and a' have a value of from 2 to 4, b and b' have a value of 0 to 2 with the proviso that the sum of b and b' is 1 or 2, and c has a value of 5 to 12; and wherein when R is the ethylenically unsaturated carboxylic acid ester of formula IVa, optionally, at least one of dimers, trimers, and tetramers are formed.

33. The method of claim 20 further comprising at least one additive selected from the group consisting of surfactants, wetting agents, protective colloids, fillers, coloring agents, antiseptics, biocides, dispersing agents, thickening agents, thixotropic agents, antifreezing agents, pH adjusting agents, corrosion inhibitors, ultraviolet light stabilizers, crosslinking promoters, antioxidants, and mixtures thereof.

34. The method of claim 20 further comprising at least one additional polymer selected from the group consisting of (meth)acrylates, styrenics, styrene-butadienes, polyurethanes, polyethers, polyesters, melamine-formaldehyde polymers, vinyl halides, vinylidene halides, poly(ethyleneimines), poly(vinyl amines), and mixtures thereof.

35. The method of claim 20, wherein each of the polymer reaction products is at least one of a batch polymerization reaction product, a seedless semi-batch polymerization reaction product, a seeded semi-batch polymerization reaction product, and a continuous polymerization reaction product.

36. The method of claim 20, wherein each of the polymer reaction product is at least one of a single stage reaction product and a multiple stage reaction product.

37. The method of claim 20, wherein a total number of all castor oil (meth)acrylate moieties ranges from about 1% to about 50% based on a total number of all moieties in all reaction products, and wherein a total number of all acetoacetoxyethyl (meth)acrylate moieties ranges from about 1% to about 60% based on the total number of all moieties in all reaction products.

38. The method of claim 20, wherein a ratio of a total number of all castor oil (meth)acrylate moieties in all reaction products to a total number of all acetoacetoxyethyl (meth)acrylate moieties ranges from about 0.1:1 to about 10:1.

39. The substrate produced by the method of claim 20.

* * * * *